United States Patent
Che et al.

(10) Patent No.: US 7,593,174 B2
(45) Date of Patent: Sep. 22, 2009

(54) METHOD OF MANUFACTURING MASTER RECORDING MEDIUM, MAGNETIC TRANSFER METHOD USING THE MANUFACTURED MASTER RECORDING MEDIUM, AND METHOD OF MANUFACTURING MAGNETIC RECORDING MEDIUM

(75) Inventors: Yanlong Che, Odawara (JP); Toshiya Takahashi, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 290 days.

(21) Appl. No.: 11/764,280

(22) Filed: Jun. 18, 2007

(65) Prior Publication Data
US 2007/0297077 A1    Dec. 27, 2007

(30) Foreign Application Priority Data
Jun. 23, 2006    (JP)    ............................... 2006-174289

(51) Int. Cl.
*G11B 5/86*    (2006.01)
(52) U.S. Cl. ....................................................... 360/16
(58) Field of Classification Search ................... 360/16, 360/17, 15, 48; 427/131, 127, 299, 430, 427/488; 428/333, 826, 835.6
See application file for complete search history.

(56) References Cited

U.S. PATENT DOCUMENTS

| | | | | |
|---|---|---|---|---|
| 4,087,582 | A | * | 5/1978 | Shirahata et al. ............. 428/333 |
| 4,992,300 | A | * | 2/1991 | Ogawa et al. ................. 427/488 |
| 4,992,316 | A | * | 2/1991 | Ogawa ..................... 428/835.6 |
| 5,147,684 | A | * | 9/1992 | Tamura et al. ............... 427/131 |
| 6,207,621 | B1 | * | 3/2001 | Takai et al. .................. 508/206 |
| 6,355,198 | B1 | | 3/2002 | Kim et al. |
| 6,909,563 | B2 | * | 6/2005 | Nishikawa et al. ............. 360/16 |
| 6,950,252 | B2 | * | 9/2005 | Nishikawa et al. ............. 360/17 |

(Continued)

FOREIGN PATENT DOCUMENTS

EP    1 511 013 A1    3/2005

(Continued)

OTHER PUBLICATIONS

Puurunen, "Surface chemistry of atomic layer deposition: A case study for the trimethylaluminum/water process," Journal of Applied Physics, vol. 97, No. 12, Jun. 30, 2005, pp. 121301-1 to -52, XP002476612.

(Continued)

*Primary Examiner*—Fred Tzeng
(74) *Attorney, Agent, or Firm*—Sughrue Mion, PLLC

(57) ABSTRACT

The present invention provides a method of manufacturing a master recording medium used for magnetic transfer and having a concavo-convex pattern formed on a surface of the recording medium, the method comprising: a surface treatment step of forming the concavo-convex pattern on a surface of a metal plate to fabricate a metal master disk; a monomolecular layer forming step of forming a monomolecular layer on a surface of the metal master disk, the surface having the concavo-convex pattern formed thereon; a metallic substrate forming step of dipping the metal master disk having the monomolecular layer formed thereon into a plating solution and forming the master recording medium by plating on the surface of the metal master disk, the surface having the monomolecular layer formed thereon; and an exfoliating step of exfoliating the master recording medium from the metal master disk.

28 Claims, 19 Drawing Sheets

U.S. PATENT DOCUMENTS

| | | | |
|---|---|---|---|
| 7,028,743 | B1 | 4/2006 | Wang et al. |
| 7,236,317 | B2* | 6/2007 | Nishikawa .................. 360/16 |
| 7,443,622 | B2* | 10/2008 | Kaizu et al. .................. 360/15 |
| 7,505,220 | B2* | 3/2009 | Soeno et al. .................. 360/16 |
| 2005/0042473 | A1 | 2/2005 | Nishikawa et al. |
| 2005/0111124 | A1* | 5/2005 | Nishikawa et al. ............ 360/16 |
| 2006/0176801 | A1* | 8/2006 | Fujiwara et al. .......... 369/275.1 |
| 2006/0177569 | A1* | 8/2006 | Fujiwara et al. ............ 427/127 |
| 2006/0181796 | A1* | 8/2006 | Komatsu et al. .............. 360/48 |
| 2006/0216550 | A1* | 9/2006 | Kasahara .................... 428/826 |
| 2006/0269791 | A1* | 11/2006 | Okawa et al. ............... 428/826 |
| 2007/0177290 | A1* | 8/2007 | Suzuki et al. ................. 360/16 |
| 2007/0229998 | A1* | 10/2007 | Kuroda et al. ................. 360/15 |
| 2008/0014456 | A1 | 1/2008 | Nishikawa et al. |

FOREIGN PATENT DOCUMENTS

| | | |
|---|---|---|
| JP | 01-201842 | 8/1989 |
| JP | 2004-265558 A | 9/2004 |
| JP | 2006-59597 A | 3/2006 |

OTHER PUBLICATIONS

JP Notice of Reasons for Rejection, dated Apr. 15, 2009, issued in corresponding JP Application No. 2006-174289, 5 pages (English and Japanese).

* cited by examiner

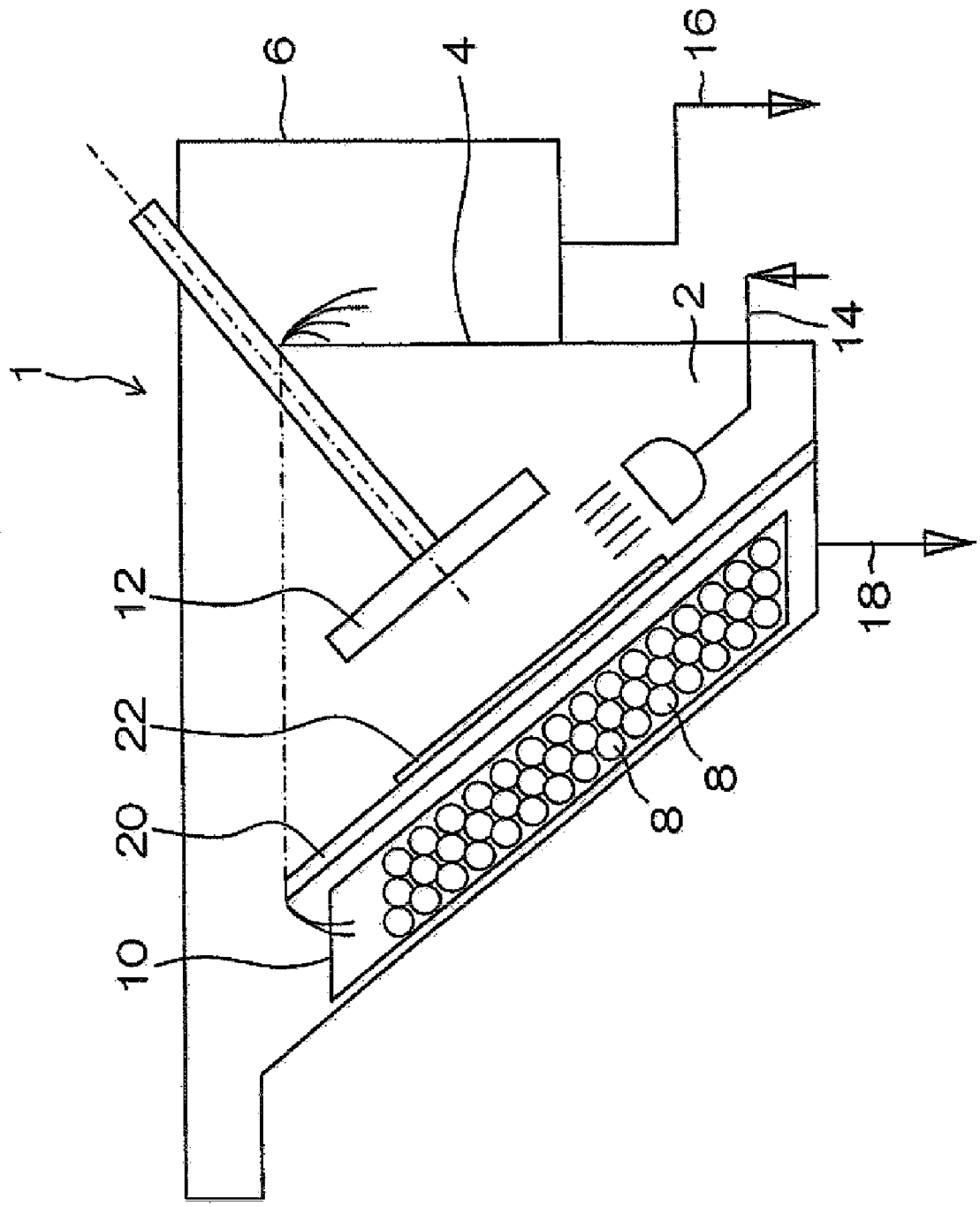

FIG.17A
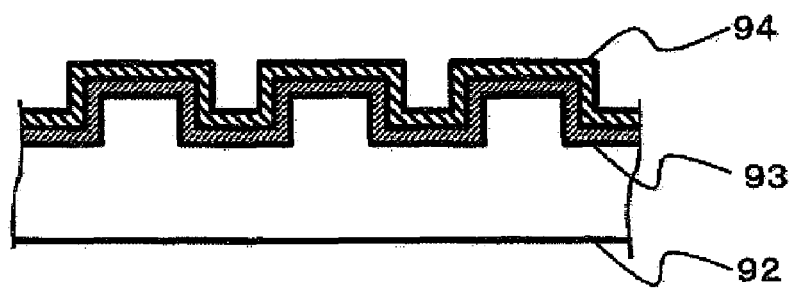
FIG.17B
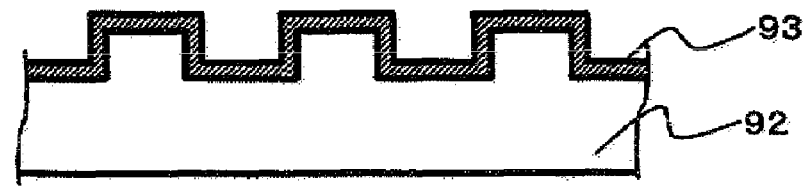

OXYGEN PLASMA IRRADIATION

METHOD OF MANUFACTURING MASTER RECORDING MEDIUM, MAGNETIC TRANSFER METHOD USING THE MANUFACTURED MASTER RECORDING MEDIUM, AND METHOD OF MANUFACTURING MAGNETIC RECORDING MEDIUM

BACKGROUND OF THE INVENTION

1. Field of the Invention

The present invention relates to a method of manufacturing a master recording medium, a magnetic transfer method using the manufactured master recording medium, and a method of manufacturing a magnetic recording medium, and particularly relates to a method of manufacturing a master recording medium with an excellent exfoliating property and low manufacturing cost, a magnetic transfer method using the manufactured master recording medium, and a method of manufacturing a magnetic recording medium.

2. Description of the Related Art

As recording media, magnetic recording media typified by a hard disk are available. A high density and high-speed processing of information are increasingly demanded of such magnetic recording media and high-density magnetic recording media are desired which can record a large amount of information with a large capacity, enable low cost, and preferably enable reading of a desired part in a short time, that is, high-speed access. In such a high-density magnetic recording medium, an information recording area is made up of narrow tracks. In order to cause a magnetic head to accurately scan with a small track width to reproduce a signal with a high signal-to-noise ratio, a so-called tracking servo technique plays a significant role. A sector servo system is widely used to perform the tracking servo technique.

In the sector servo system, servo information including a servo signal for positioning a track, an address information signal of the track, and a reproduction clock signal is recorded in servo fields correctly arranged with a fixed angle and the like on a data surface of a magnetic recording medium such as a magnetic disk, and a magnetic head scans the servo fields to read the servo information and corrects the position of the head while locating the head.

It is necessary to record the servo information as a preformat beforehand on a magnetic recording medium during the manufacturing of the magnetic recording medium, and preformatting is currently performed using a dedicated servo recorder. A currently used servo recorder has, for example, a magnetic head having a head width about 75% of a track pitch. A magnetic disk is rotated in a state in which the magnetic head is disposed close to the magnetic disk; meanwhile a servo signal is recorded for each half track while the magnetic head is moved from the outer edge to the inner edge of the magnetic disk. Thus it takes a long time to perform preformat recording on a magnetic disk, resulting in low production efficiency and increase in cost.

Thus as an accurate and efficient method of preformatting, a method of magnetically transferring information on a master recording medium to a magnetic recording medium is disclosed. A pattern corresponding to servo information is formed on the master recording medium.

In such magnetic transfer, a master recording medium is used which has a transfer pattern including a concavo-convex pattern according to information to be transferred to a magnetic recording medium (slave medium) such as a transfer magnetic disk, and a magnetic field for recording is applied in a state in which the master recording medium and the magnetic recording medium are in contact with each other, so that a magnetic pattern corresponding to information (for example, servo information) recorded with the concavo-convex pattern of the master recording medium is magnetically transferred to the magnetic recording medium. In this method, recording can be statically performed without changing the relative positions of the master recording medium and the magnetic recording medium, preformat information can be accurately recorded, and quite a short recording time can be achieved. Two magnetic transfer methods are available which include perpendicular magnetic recording for recording magnetization information to be transferred to a magnetic recording medium by perpendicular magnetization and in-plane magnetic recording for recording magnetization information by in-plane magnetization parallel to a magnetic recording medium.

In order to perform such magnetic transfer, a master recording medium is used which is a master disk having a concavo-convex pattern formed thereon. Japanese Patent Application Laid-Open No. 2004-265558 and Japanese Patent Application Laid-Open No. 2006-59597 disclose the method of manufacturing the master recording medium. A high density is also increasingly demanded of such a magnetic recording medium typified by a hard disk. The larger the recording capacity, the smaller the concavo-convex pattern formed on the master recording medium.

SUMMARY OF THE INVENTION

A master recording medium used for magnetic transfer is fabricated by exfoliating a Ni electroformed layer formed on a master disk. As a concavo-convex pattern formed on the Ni electroformed layer becomes smaller, an exfoliating property for exfoliating the Ni electroformed layer from the master disk is degraded. Particularly as the width of the pattern decreases or as a ratio of the depth of the pattern to the line width of the pattern (aspect ratio) increases, the exfoliating property is degraded. When the exfoliating property is degraded thus, a concavo-convex pattern recorded on the master disk is not accurately transferred to a Ni electroformed layer serving as a master recording medium. Thus the quality of a manufactured magnetic recording medium is worsened. Therefore, although small patterns can be formed on the master disk to achieve a high density, a high-density magnetic recording medium cannot be obtained unless the pattern can be accurately transferred to the Ni electroformed layer.

Further, the master recording medium used for magnetic transfer is in contact with a master disk and may be deformed when exfoliated from the master disk. When such deformation is irreversible, the function of the master recording medium is lost.

Such deformation depends upon the temperature of a plating solution, a method of changing an applied current, the concentration of the plating solution, and so on in electroformation, and can be reduced by production control. On the other hand, it is difficult to automate equipment for a process of exfoliating a Ni electroformed layer which is formed by electroforming a master disk and serves as a master recording medium, so that manual exfoliation achieves higher accuracy at present. Thus the main cause of deformation is distortion created by a force applied to the Ni electroformed layer during the exfoliation.

Particularly when a Ni electroformed layer is formed on a master disk made of a metal, a surface of the master disk is generally oxidized beforehand to improve an exfoliating property between the master disk made of a metal and the Ni electroformed layer. An oxidation method includes a method of dipping a master disk into a chemical solution (for example, a solution containing potassium permanganate powder and diluted with pure water) or ashing with oxygen plasma.

However, in the case of a fine and elaborate shape, flatness on a surface of the master disk is reduced by improving the exfoliating property with this method. Further, in the case of a concavo-convex pattern, it is not possible to sufficiently oxidize a surface of a recessed portion and it is difficult to exfoliate the insufficiently oxidized areas of the master disk and the Ni electroformed layer, so that the Ni electroformed layer may be irreversibly deformed by exfoliation.

In the case where the master recording medium is deformed thus, information is not accurately transferred to the magnetic recording medium during magnetic transfer. Particularly in the case of a fine concavo-convex pattern corresponding to a high density, such deformation becomes apparent, so that the uniformity and the yields of products are reduced.

The present invention is designed in view of these circumstances and has as its object the provision of a method of manufacturing a master recording medium, a magnetic transfer method using the master recording medium, a method of manufacturing a magnetic recording medium, and a method of manufacturing a magnetic recording/reproducing apparatus, by which when the master recording medium for magnetic transfer is fabricated by a plating method such as Ni electroforming, an excellent exfoliating property and high flatness can be achieved even in the case of a fine concavo-convex pattern during the exfoliation of the master recording medium from a master disk.

A first aspect of the present invention is a method of manufacturing a master recording medium used for magnetic transfer and having a concavo-convex pattern formed on the surface of the recording medium, the method comprising: a surface treatment step of forming the concavo-convex pattern on a surface of a metal plate to fabricate a metal master disk; a monomolecular layer forming step of forming a monomolecular layer on the surface of the metal master disk, the surface having the concavo-convex pattern formed thereon; a metallic substrate forming step of dipping the metal master disk having the monomolecular layer formed thereon into a plating solution and forming the master recording medium by plating on the surface of the metal master disk, the surface having the monomolecular layer formed thereon; and an exfoliating step of exfoliating the master recording medium from the metal master disk.

The invention of a second aspect is the method of manufacturing a master recording medium according to the first aspect, wherein after the exfoliating step is completed, a plurality of master recording media having the same shape are fabricated by repeating the metallic substrate forming step and the exfoliating step.

The invention of a third aspect is the method of manufacturing a master recording medium according to the first aspect, wherein after the exfoliating step is completed, a plurality of master recording media having the same shape are fabricated by repeating: a monomolecular layer removing step of removing the monomolecular layer adhering to the metal master disk; a monomolecular layer forming step of forming, after the monomolecular layer is removed, another monomolecular layer on the surface of the metal master disk, the surface having the concavo-convex pattern formed thereon; a metallic substrate forming step of dipping the metal master disk having the monomolecular layer formed thereon into the plating solution and forming the master recording medium by plating on the surface of the metal master disk, the surface having the monomolecular layer formed thereon; and an exfoliating step of exfoliating the master recording medium from the metal master disk.

The invention of a fourth aspect is a method of manufacturing a master recording medium used for magnetic transfer and having a concavo-convex pattern formed on the surface of the recording medium, the method comprising: a surface treatment step of forming the concavo-convex pattern on a surface of one of a nonconductive material and a semiconductor material to fabricate a nonconductive master disk; an electric conductor layer forming step of forming an electric conductor layer on the surface of the nonconductive master disk, the surface having the concavo-convex pattern formed thereon; a monomolecular layer forming step of forming a monomolecular layer on the electric conductor layer; a metallic substrate forming step of dipping the nonconductive master disk having the monomolecular layer formed thereon into a plating solution and forming the master recording medium by plating on the surface of the nonconductive master disk, the surface having the monomolecular layer formed thereon; and an exfoliating step of exfoliating the master recording medium from the nonconductive master disk.

The invention of a fifth aspect is the method of manufacturing a master recording medium according to the fourth aspect, wherein after the exfoliating step is completed, a plurality of master recording media having the same shape are fabricated by repeating the step metallic substrate forming step and the exfoliating step.

The invention of a sixth aspect is the method of manufacturing a master recording medium according to the fourth aspect, wherein after the exfoliating step is completed, a plurality of master recording media having the same shape are fabricated by repeating: a monomolecular layer removing step of removing the monomolecular layer adhering to a surface of the electric conductor layer of the nonconductive master disk; a monomolecular layer forming step of forming, after the monomolecular layer is removed, another monomolecular layer on the surface of the electric conductor layer of the nonconductive master disk; a metallic substrate forming step of dipping the nonconductive master disk having the monomolecular layer formed thereon into the plating solution and forming the master recording medium by plating on the surface of the nonconductive master disk, the surface having the monomolecular layer formed thereon; and an exfoliating step of exfoliating the master recording medium from the nonconductive master disk.

The invention of a seventh aspect is a method of manufacturing a master recording medium used for magnetic transfer and having a concavo-convex pattern formed on the surface of the recording medium, the method comprising the steps of: a surface treatment step of forming the concavo-convex pattern on a surface of one of a nonconductive material and a semiconductor material to fabricate a nonconductive master disk; a monomolecular layer forming step of forming a monomolecular layer on the surface of the nonconductive master disk, the surface having the concavo-convex pattern formed thereon; an electric conductor layer forming step of forming an electric conductor layer on the monomolecular layer; a metallic substrate forming step of dipping the nonconductive master disk having the electric conductor layer formed thereon into a plating solution and forming the master recording medium by plating on the surface of the nonconductive master disk, the surface having the electric conductor layer formed thereon; and an exfoliating step of exfoliating the master recording medium from the nonconductive master disk.

The invention of an eighth aspect is the method of manufacturing a master recording medium according to the seventh aspect, wherein after the exfoliating step is completed, a plurality of master recording media having the same shape are fabricated by repeating the electric conductor layer forming step, the metallic substrate forming step, and the exfoliating step.

The invention of a ninth aspect is the method of manufacturing a master recording medium according to the seventh aspect, wherein after the exfoliating step is completed, a plurality of master recording media having the same shape are fabricated by repeating: a monomolecular layer removing step of removing the monomolecular layer adhering to the nonconductive master disk; a monomolecular layer forming step of forming, after the monomolecular layer is removed, another monomolecular layer on the surface of the nonconductive master disk, the surface having the concavo-convex pattern formed thereon; an electric conductor layer forming step of forming an electric conductor layer on the monomolecular layer; a metallic substrate forming step of dipping the nonconductive master disk having the electric conductor layer formed thereon into the plating solution and forming the master recording medium by plating on the surface of the nonconductive master disk, the surface having the electric conductor layer formed thereon; and an exfoliating step of exfoliating the master recording medium from the nonconductive master disk.

The invention of a tenth aspect is the method of manufacturing a master recording medium according to any one of the fourth to ninth aspects, wherein the nonconductive master disk is made of a material including Si, $SiO_2$, SiC and $Al_2O_3$.

The invention of an eleventh aspect is the method of manufacturing a master recording medium according to any one of the fourth to tenth aspects, wherein the electric conductor layer is formed by a sputtering method, a CVD method, a vacuum evaporation method, and an electroless plating method.

The invention of a twelfth aspect is the method of manufacturing a master recording medium according to any one of the fourth to eleventh aspects, wherein in the metallic substrate forming step, the master recording medium is formed by electroforming one of Ni, Cu, Au, Ta, Cr and a metallic element and an alloy containing one of Fe and Ni.

The invention of a thirteenth aspect is the method of manufacturing a master recording medium according to any one of the first to twelfth aspects, wherein the monomolecular layer is made of a material containing carbon.

The invention of a fourteenth aspect is the method of manufacturing a master recording medium according to any one of the first to thirteenth aspects, further comprising the steps of: forming a protective film on the master recording medium exfoliated in the exfoliating step; stamping the master recording medium having the protective film formed thereon with a predetermined die; removing the protective film adhering to the master recording medium after the master recording medium is stamped with the die; forming a magnetic layer made of a soft magnetic material on the surface of the master recording medium after the protective film is removed, the surface having the concavo-convex pattern formed thereon; and forming a protective layer on the magnetic layer.

The invention of a fifteenth aspect is a magnetic transfer method, comprising: the step of contacting the master recording medium according to the first to fourteenth aspects and a magnetic recording medium; and a magnetic transfer step of magnetically transferring, to the magnetic recording medium, information including a concavo-convex pattern recorded on the master recording medium, by applying a magnetic field to the contacted master recording medium and magnetic recording medium.

The invention of a sixteenth aspect is a method of manufacturing a magnetic recording medium, comprising: the step of contacting the master recording medium according to the first to fourteenth aspects and the magnetic recording medium; and a magnetic transfer step of magnetically transferring, to the magnetic recording medium, information including a concavo-convex pattern recorded on the master recording medium, by applying a magnetic field to the contacted master recording medium and magnetic recording medium.

In the present specification, a material making up the nonconductive master disk includes a semiconductor material as well as a nonconductive material.

As described above, according to the method of manufacturing a master recording medium of the present invention, it is possible to manufacture a large number of master recording media with an excellent exfoliating property and low manufacturing cost. The master recording medium manufactured thus does not cause deformation and the like even when a fine concavo-convex pattern is provided, and thus even the fine pattern can be magnetically transferred with precision during magnetic transfer. Therefore, it is possible to manufacture a large number of magnetic recording media and magnetic recording/reproducing apparatuses for high-density recording with high uniformity.

BRIEF DESCRIPTION OF THE DRAWINGS

FIG. 3 is a schematic diagram showing an electroforming apparatus used in the present invention;

FIGS. 17A and 17B are explanatory drawings showing the method of manufacturing the master disk according to the eighth embodiment;

DETAILED DESCRIPTION OF THE PREFERRED EMBODIMENTS

The first embodiment of the present invention will now be described below.

[Master Disk]

The following is a method of manufacturing a master disk which is a master recording medium used for magnetic transfer according to the first embodiment of the present invention. In the present embodiment, a metal master disk is used as a master to manufacture a master disk.

Figure 1:
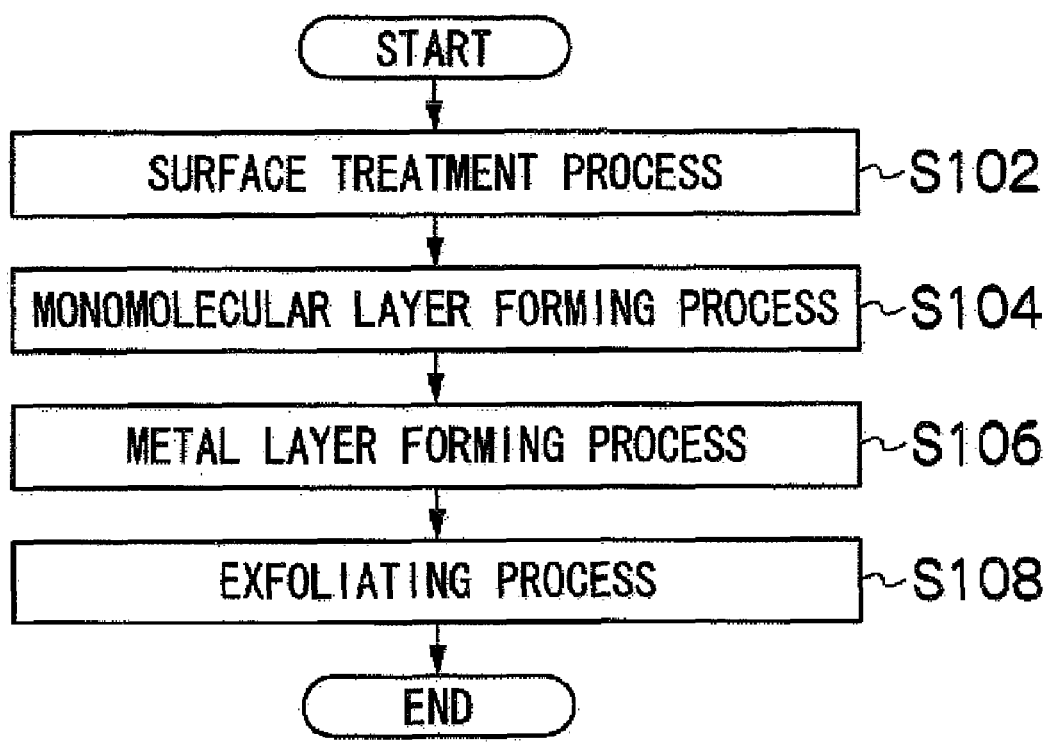
FIG. 1 is a flowchart showing a method of manufacturing a master disk according to the first embodiment.

FIG. 1 is a flowchart showing a flow of manufacturing a master recording medium by electroforming according to the present embodiment. FIGS. 2A to 2D are process drawings showing the manufacturing method according to the present embodiment.

Figure 2A:
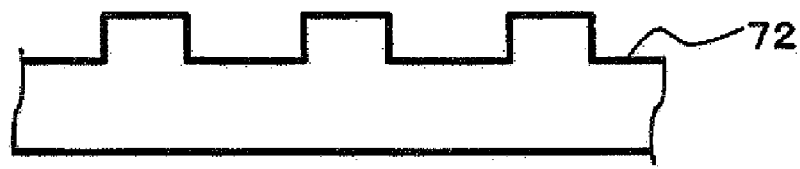
FIGS. 2A to 2D are process drawings showing the method of manufacturing the master disk according to the first embodiment.

First, a surface treatment process of step 102 (S102) is performed. To be specific, a metal master disk 72 serving as a master is fabricated as shown in FIG. 2A. The metal master disk 72 has a concavo-convex pattern formed thereon and is made of a metallic material. The concavo-convex pattern on the metal master disk 72 is formed by performing Ni electroforming on a Si substrate having a predetermined concavo-convex pattern formed thereon, or performing working such as cutting on a surface of a metal plate. With these methods, the metal master disk 72 serving as a master is fabricated as shown in FIG. 2A.

Figure 2B:
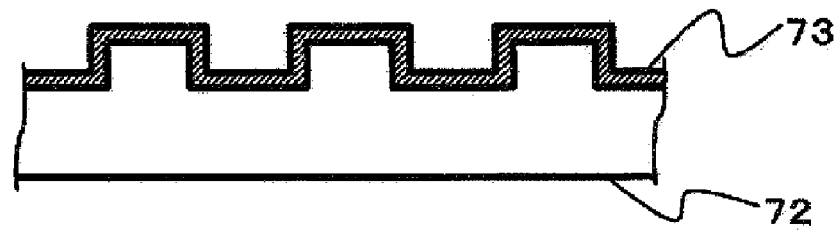

Next, a monomolecular layer forming process of step 104 (S104) in FIG. 1 is performed. To be specific, as shown in FIG. 2B, a monomolecular layer 73 having a thickness of 2 nm to 3 nm is formed on an uneven surface of the metal master disk 72. The monomolecular layer 73 is formed by so-called dip coating. A material making up the monomolecular layer 73 is a carbon-containing material including hexadecanethiol ($CH_3(CH_2)_{15}SH$), octanethiol ($CH_3(CH_2)_7SH$, $C_8H_{17}SH$), and butanethiol ($CH_3(CH_2)_3SH$).

Figure 2C:
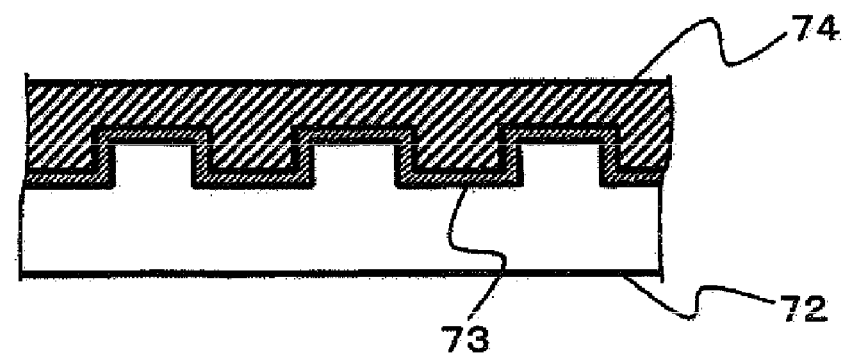

Next, a metal layer forming process of step 106 (S106) in FIG. 1 is performed. To be specific, as shown in FIG. 2C, Ni electroforming is performed to form a Ni electroformed layer 74 as a metal layer on the monomolecular layer 73 formed on the metal master disk 72. The monomolecular layer 73 does not have any insulating properties, and thus Ni electroforming can be directly performed on the surface of the monomolecular layer 73.

FIG. 3 shows an electroforming apparatus 1 for performing Ni electroforming. The electroforming apparatus 1 is made up of an electroforming chamber 4 for storing a plating solution 2, a drain chamber 6 for receiving the plating solution 2 overflowing the electroforming chamber 4, an anode chamber 10 which is filled with Ni pellets 8 serving as anodes and receives the plating solution 2 overflowing the electroforming chamber 4, and a cathode 12 for holding the metal master disk 72.

The plating solution 2 is supplied to the electroforming chamber 4 through a plating solution feed pipe 14. The plating solution 2 overflowing the electroforming chamber 4 to the drain chamber 6 is collected through a drain chamber drain pipe 16. Further, the plating solution 2 overflowing the electroforming chamber 4 to the anode chamber 10 is collected through an anode chamber drain pipe 18.

The electroforming chamber 4 and the anode chamber 10 are divided by a partition plate 20. Moreover, an electrode interruption plate 22 is fixed on a surface of the partition plate 20 on the side of the electroforming chamber 4 such that the electrode interruption plate 22 is opposed to the cathode 12. The electrode interruption plate 22 is formed to cover a predetermined part of an electrode such that an electroformed film has an even thickness in the plane.

In the electro forming apparatus 1 configured thus, the metal master disk 72 is held by the cathode 12, the cathode 12 is connected to a negative electrode, and the anode chamber 10 is connected to a positive electrode to pass current, so that electroforming is performed for the Ni electroformed layer 74.

By controlling a current density and time in the electroforming, the internal stress of the Ni electroformed layer 74 can be reduced, the surface of the Ni electro formed layer 74 can be more flattened after the electro forming, and surface roughness can be considerably reduced.

Figure 2D:

Next, an exfoliating process of step 108 (S108) in FIG. 1 is performed. To be specific, as shown in FIG. 2D, the metal master disk 72 serving as a master and the Ni electroformed layer 74 are exfoliated from each other. The monomolecular layer 73 is formed between the metal master disk 72 and the Ni electroformed layer 74. Since the monomolecular layer 73 is provided, an exfoliating property for exfoliating the Ni electro formed layer 74 from the metal master disk 72 is improved, so that the Ni electroformed layer 74 can be exfoliated from the metal master disk 72 in a remarkably fine state.

Through these processes, a master disk including the Ni electroformed layer 74 is fabricated. In the metal layer forming process, by changing solutions during electro forming, metallic materials such as FeCo and Cr can be electro formed in addition to Ni. Further, in the present embodiment, the electroforming method of electroplating was described as the metal layer forming process of step 106. Electroplating may be electroless plating which can also improve the exfoliating property.

In this way, the master disk made up of the Ni electroformed layer 74 serving as a metal layer is fabricated.

The master disk may be made up of only the Ni electroformed layer 74. In the present embodiment, after a protective film is formed on the Ni electroformed layer 74, the Ni electroformed layer 74 is stamped with predetermined dies for a 0.85-inch hard disk, a 1-inch hard disk, a 1.8-inch hard disk, a 2.5-inch hard disk, and a 3.25-inch hard disk (in the present embodiment, a die for a 2.5-inch hard disk is used), the protective film is removed, and a magnetic layer 48 made of a soft magnetic material is formed on a surface of a Ni electroformed disk 47 serving as the Ni electroformed layer 74, the surface having the concavo-convex pattern formed thereon. After that, a protective layer 49 was formed thereon to fabricate a master disk 46.

The magnetic layer 48 is preferably made of a soft magnetic material having a coercive force Hc of 48 kA/m ($\approx$600 Oe) or less. To be specific, the soft magnetic material includes Co, a Co alloy (CoNi, CoNiZr, CoNbTaZr, and so on), Fe, an Fe alloy (FeCo, FeCoNi, FeNiMo, FeAlSi, FeAl, FeTaN), Ni, and a Ni alloy (NiFe). FeCo and FeCoNi are particularly preferable in view of magnetic properties. The magnetic layer 48 is preferably 40 nm to 320 nm in thickness and more preferably 100 nm to 300 nm in thickness. The magnetic layer 48 is formed by sputtering and the like with the targets of these materials.

The protective layer 49 is a film made of a material such as diamond-like carbon (DLC). As will be described later, the master disk 46 is brought into contact with a transfer magnetic disk 40. The magnetic layer 48 is prone to scratches when the master disk 46 is contacted. Thus the protective layer 49 is provided to prevent the master disk 46 from being unusable. Further, a lubricant layer may be provided on the protective layer 49. The lubricant layer prevents the occurrence of scratches caused by friction when the master disk 46 is contacted with the transfer magnetic disk 40, and improves durability.

Figure 20:
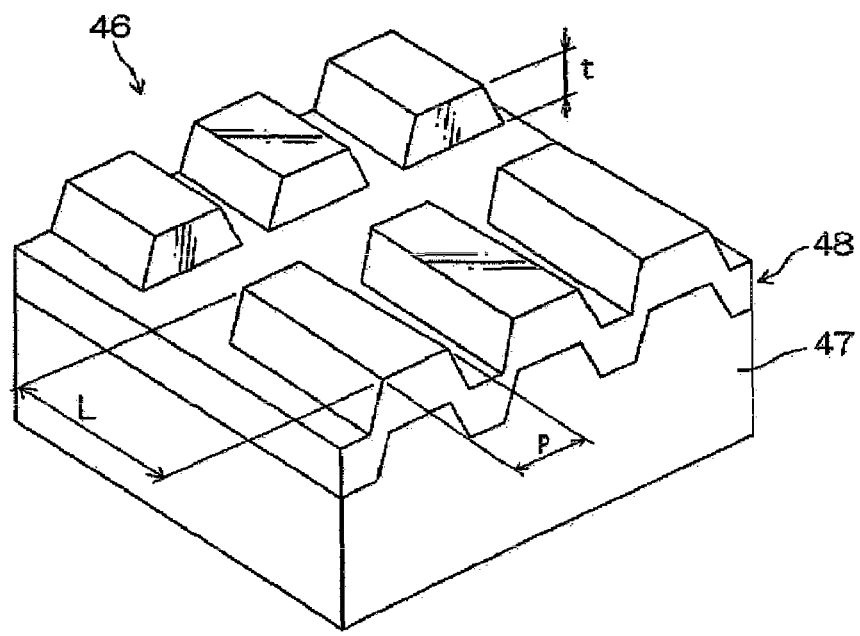
FIG. 20 is a perspective view showing the master disk manufactured according to the present invention.

In the present embodiment, as shown in FIG. 20 (the protective layer is not shown), the concavo-convex pattern formed on the master disk 46 has a length P of 30 nm to 300 nm and a length L of 30 nm to 300 nm. A height (depth) t of a formed protrusion pattern is preferably 30 nm to 200 nm.

[Transfer Magnetic Disk]

The following is the transfer magnetic disk which is a magnetic recording medium used for magnetic transfer.

Figure 4A:
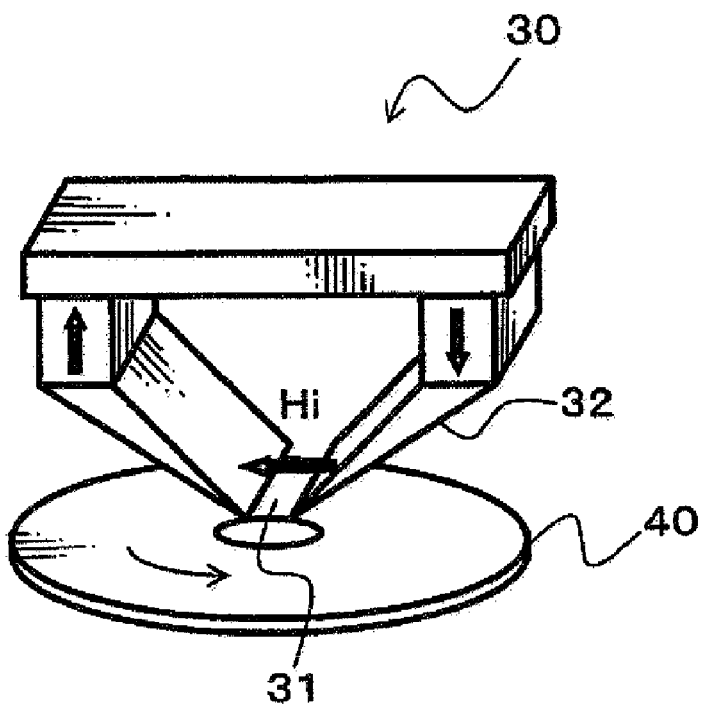
FIGS. 4A to 4C are process drawings showing a magnetic transfer method according to the first embodiment.

As shown in FIG. 4A, initial magnetization is first performed on the transfer magnetic disk 40 which is a magnetic recording medium. The transfer magnetic disk 40 used for initial magnetization will be first described below.

The transfer magnetic disk 40 is obtained by forming a magnetic layer including an in-plane magnetization film on one side or both sides of a disk-like substrate. A high-density hard disk and the like are available as the transfer magnetic disk 40.

The disk-like substrate is made of a material such as glass and Al (aluminum). After a non-magnetic layer is formed on the substrate, a magnetic layer is formed thereon.

The non-magnetic layer is provided to increase magnetic anisotropy in the in-plane direction of the magnetic layer to be formed later. The non-magnetic layer is preferably made of a material including Ti (titanium), Cr (chromium), CrTi, CoCr, CrTa, CrMo, NiAl, Ru (ruthenium), and Pd (palladium). The non-magnetic layer is formed by forming a film of these materials by a sputtering method. The non-magnetic layer is preferably 10 nm to 150 nm in thickness and more preferably 20 nm to 80 nm in thickness.

The magnetic layer is formed of an in-plane magnetization film and information is recorded on the magnetic layer. The magnetic layer is preferably made of a material such as Co (cobalt), a Co alloy (CoPtCr, CoCr, CoPtCrTa, CoPtCrNbTa, CoCrB, CoNi, and so on), Fe, an Fe alloy (FeCo, FePt, FeCoNi, and so on). These materials have a high magnetic flux density and are provided with in-plane magnetic anisotropy by adjusting the film-forming conditions and composition. The magnetic layer is formed by forming a film of these materials by the sputtering method. The magnetic layer is preferably 10 nm to 500 nm in thickness and more preferably 20 nm to 200 nm in thickness.

When necessary, a soft magnetic layer may be provided between the substrate and the non-magnetic layer to stabilize the in-plane magnetization state of the magnetic layer and improve a sensitivity during recording/reproduction. The soft magnetic layer is preferably 50 nm to 2000 nm in thickness and more preferably 80 nm to 400 nm in thickness.

In the present embodiment, the substrate of the transfer magnetic disk is a disk-like glass substrate having an outside diameter of 2.5 inches. The glass substrate is set in the chamber of a sputtering apparatus and the pressure is reduced to $1.33 \times 10^{-5}$ Pa ($1.0 \times 10^{-7}$ Torr). And then, Ar (argon) gas is introduced into the chamber and the substrate is discharged using a CrTi target at a substrate temperature of 200° C., so that a film is formed by sputtering. Thus a non-magnetic layer of CrTi with a thickness of 60 nm is formed.

Thereafter, Ar gas is introduced in the same manner and the substrate is discharged using a CoCrPt target in the same chamber at the same substrate temperature of 200° C., so that a film is formed by sputtering. Thus a magnetic layer of CoCrPt with a thickness of 25 nm is formed.

Through these processes, the transfer magnetic disk 40 was fabricated in which the non-magnetic layer and the magnetic layer are formed on the glass substrate.

[Initial Magnetization of the Transfer Magnetic Disk]

Figure 5A:
FIGS. 5A to 5C are explanatory drawings showing magnetic transfer according to the first embodiment.

Next, initial magnetization is performed on the formed transfer magnetic disk 40. As shown in FIG. 4A, initial magnetization (DC magnetization) is performed on the transfer magnetic disk 40 by a magnetic field applying device 30. The magnetic field applying device 30 can generate an initialization magnetic field Hi in the direction of an arrow by means of an electromagnet, and has a gap 31 which is extended in the radial direction of the transfer magnetic disk 40 by a core 32. By the initialization magnetic field Hi leaking from the gap 31, as shown in FIG. 5A, initial magnetization is performed on a magnetic layer 40M of the transfer magnetic disk 40 in one direction of the track direction (circumferential direction). To be specific, in this initial magnetization, a magnetic field having an intensity equal to or larger than the coercive force Hc of the transfer magnetic disk 40 is generated in the gap 31 and the transfer magnetic disk 40 is rotated, so that initial magnetization is performed on all the tracks of the transfer magnetic disk 40. The initialization magnetic field Hi is applied in the direction of the arrow substantially in parallel with the tracks of the transfer magnetic disk 40. The initial magnetization may be performed by, instead of rotating the transfer magnetic disk 40, rotating the magnetic field applying device 30 relative to the transfer magnetic disk 40.

[Contacting Process]

Figure 4B:
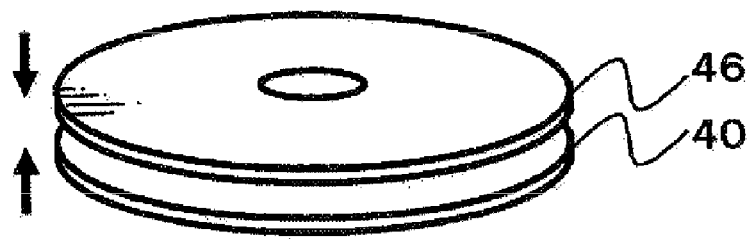

Next, in a contacting process shown in FIG. 4B, a surface of the master disk 46 fabricated by the above process and a surface of the transfer magnetic disk 40 are contacted with each other with a predetermined pressing force. The concavo-convex pattern is formed on the surface of the master disk 46 and the magnetic layer 40M is formed on the surface of the transfer magnetic disk 40.

Before the transfer magnetic disk 40 is contacted with the master disk 46, cleaning (including burnishing) is performed on the transfer magnetic disk 40 when necessary. In the cleaning, small protrusions or adhesive dust on the surface are removed by a glide head, an abrasive material, and so on.

In the contacting process, as shown in FIG. 4B, the master disk 46 is contacted with one side of the transfer magnetic disk 40. Alternatively, the master disks 46 are contacted with the magnetic layers 40M formed on both sides of the transfer magnetic disk 40. In the latter case, an advantage is that the pattern can be simultaneously transferred on both sides.

[Magnetic Transfer Process]

Figure 4C:
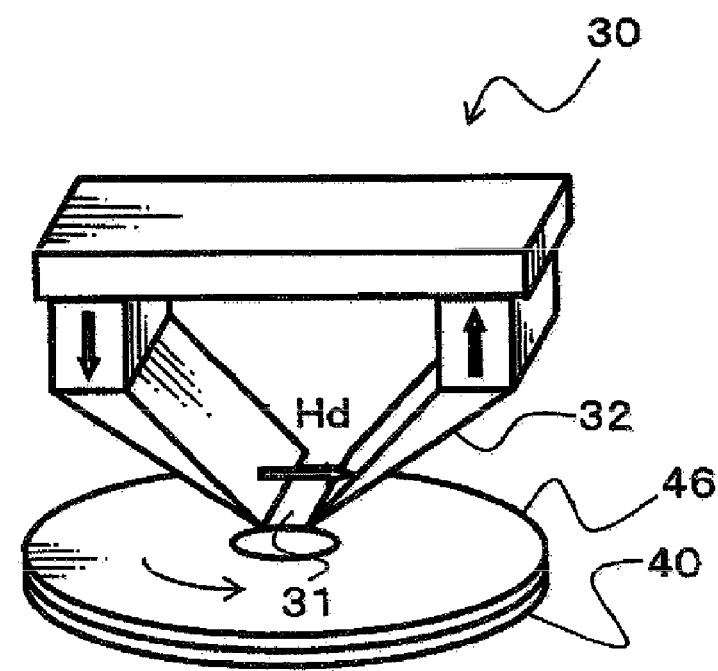

Referring to FIG. 4C, the magnetic transfer process will be discussed below.

On the transfer magnetic disk 40 and the master disk 46 which are contacted with each other in the contacting process, a magnetic field is generated by the magnetic field applying device 30 in the opposite direction from the direction of initial magnetization. Magnetic fluxes are generated by a magnetic field in the directions of arrows in the core 32, and the magnetic flux of a recording magnetic field Hd leaking from the gap 31 enters the transfer magnetic disk 40 and the master disk 46, so that magnetic transfer is performed.

Figure 6:
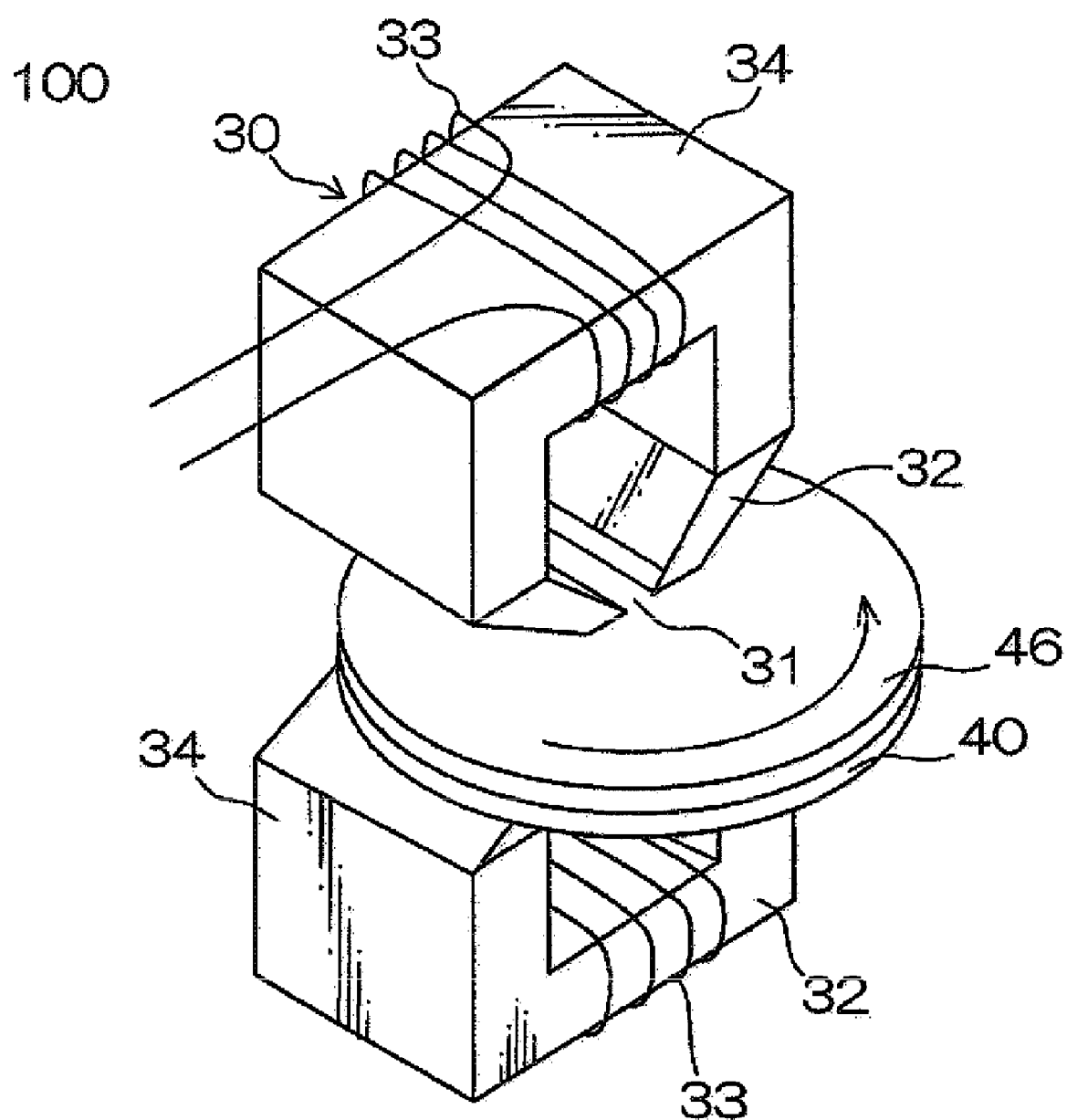
FIG. 6 is a schematic diagram showing a magnetic transfer device used in the present invention.

FIG. 6 shows the detail of a magnetic transfer device used for magnetic transfer. A magnetic transfer device 100 has the magnetic field applying device 30 which is made up of an electromagnet 34 having a coil 33 wound around a core 32. A magnetic field is generated in the gap 31 by passing current through the coil 33. The direction of the generated magnetic field can be changed according to the direction of current passing through the coil 33. Therefore, in the case of magnetic transfer, current is passed through the coil 33 of the magnetic field applying device 30 in the opposite direction from the current passing through the coil 33 during initial magnetization. In FIG. 6, the magnetic field applying devices 30 are provided above and below the contacted transfer magnetic disk 40 and master disk 46. Magnetic fields can be generated in the gap 31 in the same direction by the magnetic field applying devices 30 provided above and below the disks.

For magnetic transfer, a rotating device (not shown) is provided to rotate the contacted transfer magnetic disk 40 and master disk 46. Meanwhile, the recording magnetic field Hd is applied by the magnetic field applying device 30 and information including the concavo-convex pattern formed on the master disk 46 is magnetically transferred to the magnetic layer 40M of the transfer magnetic disk 40. In addition to this configuration, a mechanism may be provided to rotate the magnetic field applying devices 30 relative to the transfer magnetic disk 40 and the master disk 46.

Figure 5B:
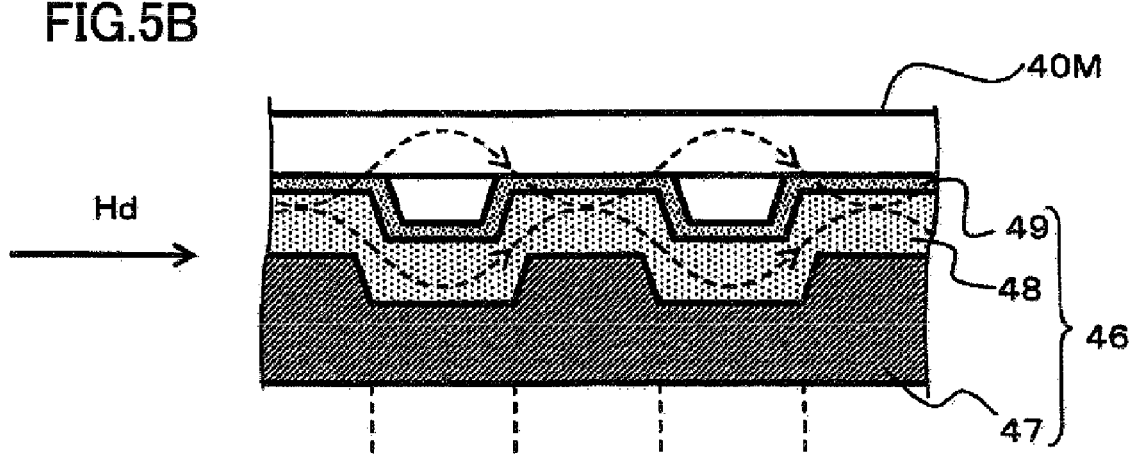

FIG. 5B is a cross sectional view showing that a magnetic field is applied to the transfer magnetic disk 40 and the master disk 46 in the magnetic transfer process.

As shown in FIG. 5B, the transfer magnetic disk 40 is contacted with the master disk 46 in which the concavo-convex pattern is formed on the surface of the Ni electroformed disk 47 serving as the Ni electroformed layer 74 and the magnetic layer 48 and the protective layer 49 are formed thereon. In this state, in a convex region of the master disk 46, the magnetic layer 48 of the master disk 46 is contacted with the magnetic layer 40M of the transfer magnetic disk 40 via the protective layer 49.

Thus when the recording magnetic field Hd is applied, in the convex region of the master disk 46, that is, in a region where the magnetic layer 48 of the master disk 46 is in contact with the magnetic layer 40M of the transfer magnetic disk 40 via the protective layer 49, a magnetic flux passes through the magnetic layer 48 of the master disk 46. This is because the magnetic layer 48 formed in the master disk 46 is made of a soft magnetic material. On the other hand, in a concave region of the master disk 46, that is, in a region where the magnetic layer 48 of the master disk 46 is not in contact with the magnetic layer 40M of the transfer magnetic disk 40 via the protective layer 49, a magnetic flux passes through the magnetic layer 48 of the master disk 46 and the magnetic layer 40M of the transfer magnetic disk 40.

Therefore, the magnetic flux generated by applying the recording magnetic field Hd enters the magnetic layer 40M of the transfer magnetic disk 40 so as to correspond to the concave region of the master disk 46, and the magnetic flux reverses the magnetization direction of this region to the same magnetization direction as the recording magnetic field Hd. On the other hand, in the convex region of the master disk 46, the magnetic flux hardly enters the magnetic layer 40M of the transfer magnetic disk 40, and thus the magnetization direction is not reversed in this region and the direction of initial magnetization is kept.

Thus information including the concavo-convex pattern provided on the master disk 46 is recorded as an in-plane magnetic pattern in the magnetic layer 40M of the transfer magnetic disk 40.

Figure 5C:
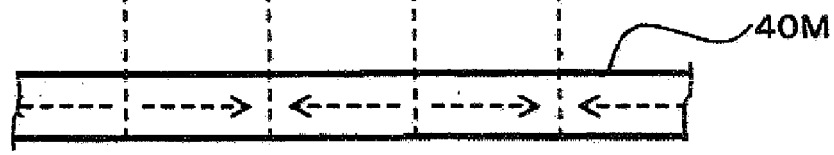

Thereafter, the transfer magnetic disk 40 is removed from the master disk 46. Thus as shown in FIG. 5C, a magnetic pattern of a servo signal and so on is recorded as information in the magnetic layer 40M of the transfer magnetic disk 40.

The concavo-convex pattern formed on the master disk 46 may be a negative pattern reversed from a positive pattern. In this case, the direction of the initialization magnetic field Hi and the direction of the recording magnetic field Hd are opposite from each other, so that a similar magnetization pattern can be magnetically transferred to the magnetic layer 40M of the transfer magnetic disk 40.

Although the magnetic field applying device 30 is an electromagnet in the present embodiment, a permanent magnet for generating a similar magnetic field may be used.

By performing magnetic transfer on the transfer magnetic disk 40 according to the above magnetic transfer method, a magnetic recording medium having recorded servo information is fabricated. Further, by providing a magnetic head such as an MR head for recording and reproducing information on the magnetic recording medium, a magnetic recording/reproducing apparatus can be fabricated. Information is recorded and reproduced by attaching the fabricated magnetic recording medium to a rotating system.

Second Embodiment

The second embodiment of the present invention will now be described below. The second embodiment is a method of manufacturing a master disk serving as a master recording medium by using a nonconductive master disk made of a material such as Si. As described above, in the present specification, a material making up the nonconductive master disk includes not only a nonconductive material but also a semiconductor material.

Figure 7:
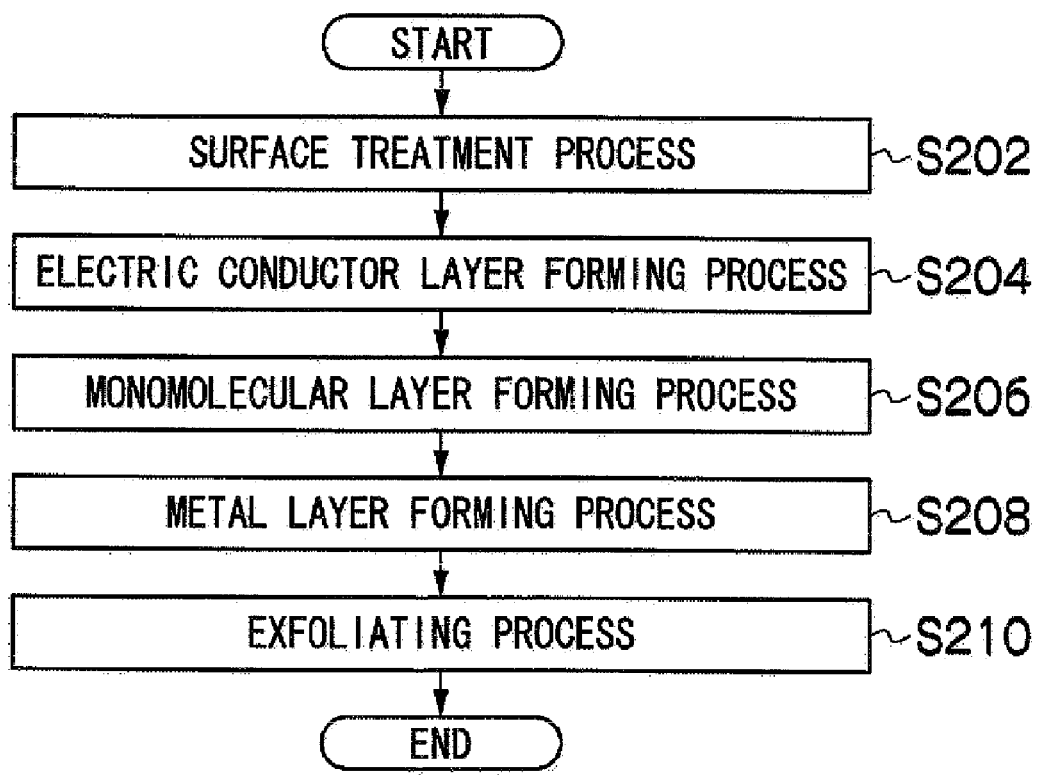
FIG. 7 is a flowchart showing a method of manufacturing a master disk according to the second embodiment.

FIG. 7 is a flowchart showing a flow of manufacturing a master disk by electroforming according to the present embodiment. FIGS. 8A to 8F are process drawings showing the manufacturing method according to the present embodiment.

Figure 8A:
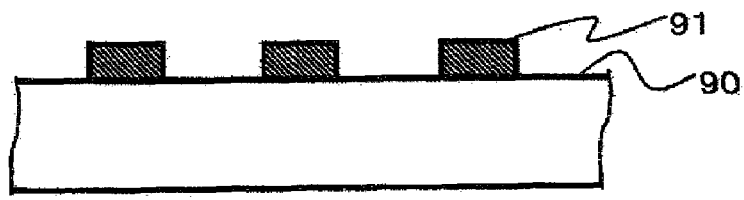
FIGS. 8A to 8F are process drawings showing the method of manufacturing the master disk according to the second embodiment.

First, a surface treatment process of step 202 (S202) is performed. To be specific, in order to fabricate a configuration shown in FIG. 8A, a positive photoresist is applied on a Si substrate 90 having a smooth surface by a spin coater and the like, a laser beam (or an electron beam) modulated for a signal to be recorded is emitted, after prebaking, to the photoresist while the Si substrate 90 is rotated, and a predetermined pattern is exposed substantially over the photoresist. After that, the exposed Si substrate 90 is dipped into a developer, so that the exposed parts of the photoresist are removed and a photoresist layer 91 is formed in predetermined regions on the Si substrate 90 as shown in FIG. 8A. Substrates made of glass, quartz, alumina ($Al_2O_3$), and SiC can be used instead of the Si substrate 90.

Figure 8B:

Next, RIE (reactive ion etching) is performed on the surface of the Si substrate 90. The photoresist layer 91 is formed on the surface. To be specific, the Si substrate 90 having the photoresist layer 91 formed thereon is set in a decompression chamber of a RIE apparatus and a pressure in the decompression chamber is reduced by a vacuum pump and the like. After that, reactive gas of $CF_4$ and the like is introduced, an RF electric field is applied to generate plasma, and the Si substrate 90 is etched. During RIE in which the reactive gas of $CF_4$ and so on is introduced, Si is etched but the photoresist is hard to etch. Thus on the Si substrate 90, Si is etched only in regions where the photoresist layer 91 is not formed. Thereafter, the photoresist layer 91 is removed by an organic solvent and the like, so that as shown in FIG. 8B, a Si master disk 92 serving as a master is fabricated.

Figure 8C:
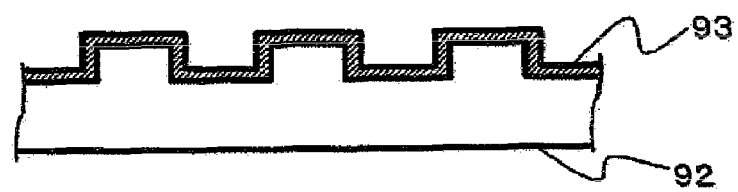
Figure 8D:
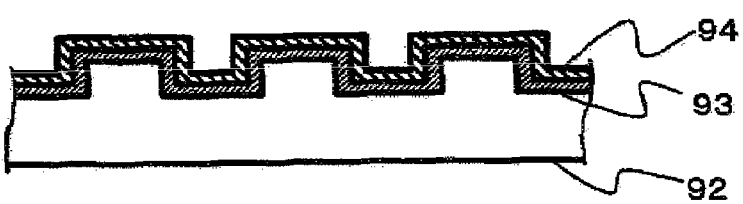

Next, an electric conductor layer forming process of step 204 (S204) in FIG. 7 is performed. To be specific, as shown in FIG. 8C, an electric conductor layer 93 is formed on an uneven surface of the Si master disk 92. The electric conductor layer 93 is formed by a sputtering method, a CVD method, a vacuum evaporation method, and an electroless plating method. Although a material making up the electric conductor layer 93 is FeCo in the present embodiment, a material such as Ni is also applicable.

Next, a monomolecular layer forming process of step 206 (S206) in FIG. 7 is performed. To be specific, a shown in FIG. 8D, a monomolecular layer 94 having a thickness of 2 nm to 3 nm is formed on the surface of the Si master disk 92, the surface having the electric conductor layer 93 formed thereon. The monomolecular layer 94 is formed by so-called dip coating. A material making up the monomolecular layer 94 is a carbon-containing material including hexadecanethiol ($CH_3(CH_2)_{15}SH$), octanethiol ($CH_3(CH_2)_7SH$, $C_8H_{17}SH$), and butanethiol ($CH_3(CH_2)_3SH$).

Figure 8E:
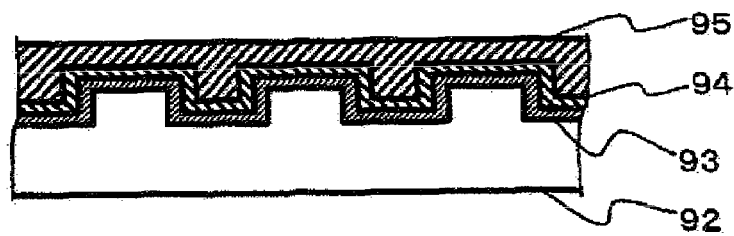

Next, a metal layer forming process of step 208 (S208) in FIG. 7 is performed. To be specific, as shown in FIG. 8E, Ni electroforming is performed to form a Ni electroformed layer 95 serving as a master disk on the monomolecular layer 94 formed on the Si master disk 92. Since the monomolecular layer 94 does not have any insulating properties, Ni electroforming can be directly performed on the surface of the monomolecular layer 94. The electroforming method is the same as that of the first embodiment.

Figure 8F:
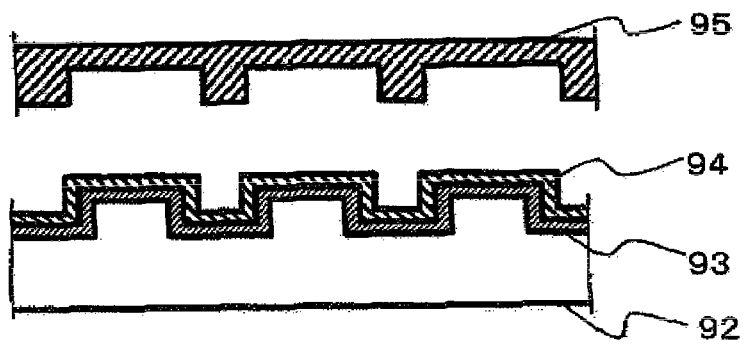

Next, an exfoliating process of step 210 (S210) in FIG. 7 is performed. To be specific, as shown in FIG. 8F, the Si master disk 92 serving as a master and the Ni electroformed layer 95 serving as a master disk are exfoliated from each other. The monomolecular layer 94 is formed between the Ni electroformed layer 95 and the electric conductor layer 93. Since the monomolecular layer 94 is provided, an exfoliating property for exfoliating the Ni electroformed layer 95 from the Si master disk 92 is improved, so that the Ni electroformed layer 95 can be exfoliated from the Si master disk 92 in a remarkably fine state.

Through these processes, a master disk including the Ni electroformed layer 95 is formed. In the metal layer forming process, by changing solutions during electroforming, materials such as FeCo and Cr can be electroformed in addition to Ni. Further, according to the present embodiment, the electroforming method of electroplating was described as the metal layer forming process of step 208. Electroplating may be electroless plating which can also improve the exfoliating property.

The master disk including the Ni electroformed layer 95 fabricated thus can be used as a master disk 46 for magnetic transfer by forming, when necessary as in the first embodiment, a magnetic layer and a protective layer on the surface where a concavo-convex pattern is formed, and the master disk is used when a servo pattern is magnetically transferred to a transfer magnetic disk 40 serving as a magnetic recording medium. Therefore, it is possible to manufacture a magnetic recording medium and a magnetic recording/reproducing apparatus.

Third Embodiment

The third embodiment of the present invention will now be described below. The third embodiment is a method of manufacturing a master disk serving as a master recording medium by using a nonconductive master disk made of a material such as Si.

Figure 9:
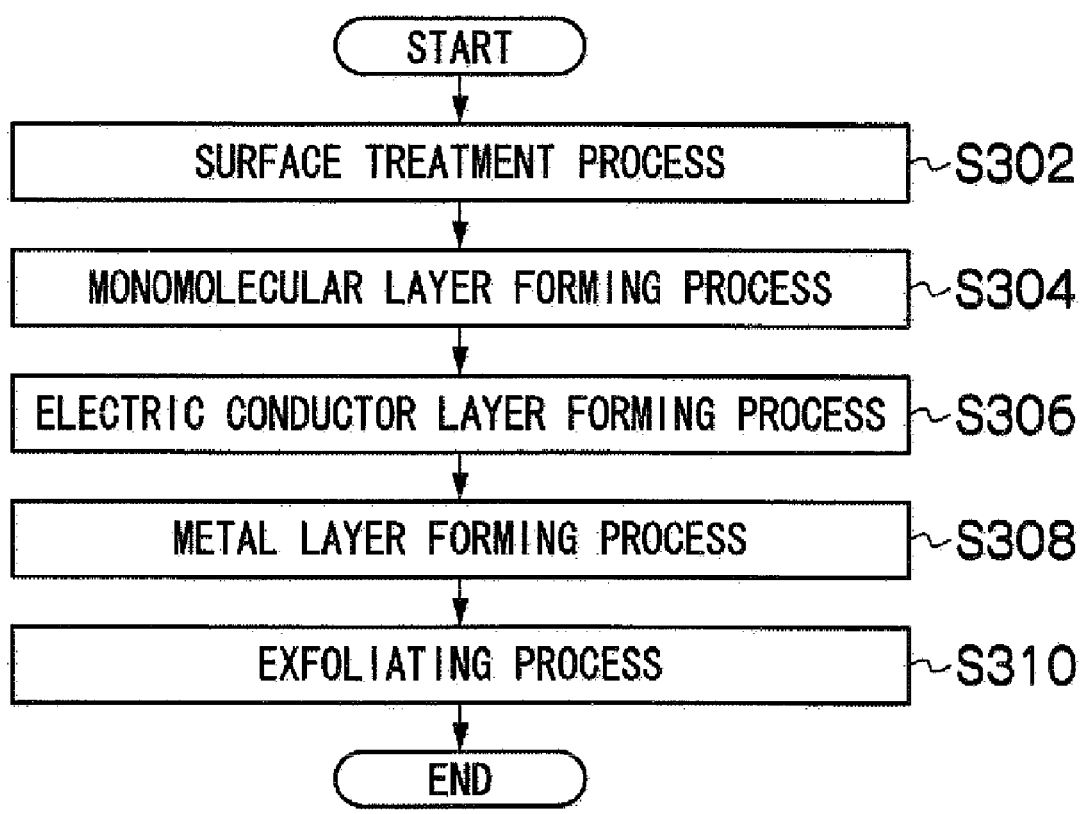
FIG. 9 is a flowchart showing a method of manufacturing a master disk according to the third embodiment.

FIG. 9 is a flowchart showing a flow of fabricating a master disk by electroforming according to the present embodiment. FIGS. 10A to 10F are process drawings showing the manufacturing method according to the present embodiment.

Figure 10A:
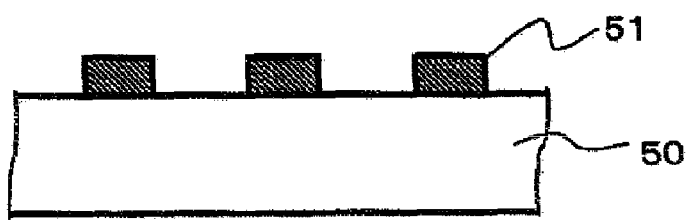
FIGS. 10A to 10F are process drawings showing the method of manufacturing the master disk according to the third embodiment.

First, a surface treatment process of step 302 (S302) is performed. To be specific, in order to fabricate a configuration shown in FIG. 10A, a positive photoresist is applied on a Si substrate 50 having a smooth surface by a spin coater and the like, a laser beam (or an electron beam) modulated for a signal to be recorded is emitted, after prebaking, to the photoresist while the Si substrate 50 is rotated, and a predetermined pattern is exposed substantially over the photoresist. After that, the exposed Si substrate 50 is dipped into a developer, so that the exposed parts of the photoresist are removed and a photoresist layer 51 is formed in predetermined regions on the Si substrate 50 as shown in FIG. 10A. Substrates made of glass, quartz, alumina ($Al_2O_3$), and SiC can be used instead of the Si substrate 50.

Figure 10B:

Next, RIE (reactive ion etching) is performed on a surface of the Si substrate 50. The photoresist layer 51 is formed on the surface. To be specific, the Si substrate 50 having the photoresist layer 51 formed thereon is set in a decompression chamber of a RIE apparatus and a pressure in the decompression chamber is reduced by a vacuum pump and the like. After that, reactive gas of $CF_4$ and the like is introduced, an RF electric field is applied to generate plasma, and the Si substrate 50 is etched. During RIE in which the reactive gas of $CF_4$ and so on is introduced, Si is etched but the photoresist is hard to etch. Thus on the Si substrate 50, Si is etched only in regions where the photoresist layer 51 is not formed. Thereafter, the photoresist layer 51 is removed by an organic solvent and the like, so that as shown in FIG. 10B, a Si master disk 52 serving as a master is fabricated.

Figure 10C:
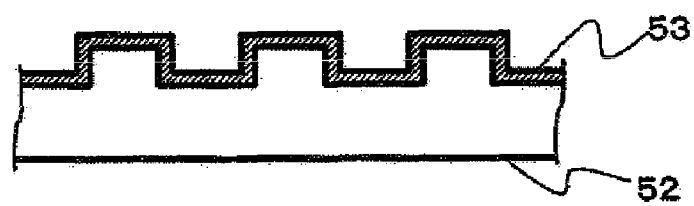

Next, a monomolecular layer forming process of step 304 (S304) in FIG. 9 is performed. To be specific, as shown in FIG. 10C, a monomolecular layer 53 having a thickness of 2 nm to 3 nm is formed on an uneven surface of the Si master disk 52. The monomolecular layer 53 is formed by so-called dip coating. A material making up the monomolecular layer 53 is a carbon-containing material including hexadecanethiol ($CH_3(CH_2)_{15}SH$), octanethiol ($CH_3(CH_2)_7SH$, $C_8H_{17}SH$), and butanethiol ($CH_3(CH_2)_3SH$).

Figure 10D:
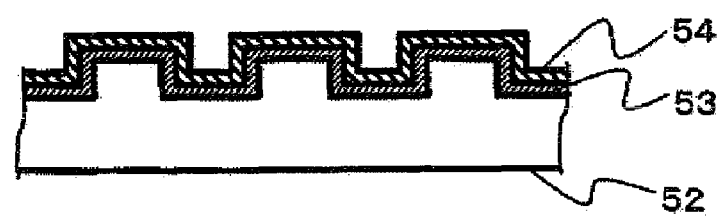

Next, an electric conductor layer forming process of step 306 (S306) in FIG. 9 is performed. To be specific, as shown in FIG. 10D, an electric conductor layer 54 is formed on the monomolecular layer 53 which is formed on the uneven surface of the Si master disk 52. The electric conductor layer 54 is formed by a sputtering method, a CVD method, a vacuum evaporation method, and an electroless plating method. Although a material making up the electric conductor layer 54 is Ni in the present embodiment, a material such as FeCo is also applicable.

By forming the electric conductor layer 54 thus on the monomolecular layer 53, it is possible to efficiently perform electroforming. Further, also in the case where the surface of the master disk is coated with a film of a different material from the master disk or in the case where a coating of the same material is applied to the surface of the master disk by a different forming method, it is possible to transfer the shape of the master as it is, thereby fabricating a master disk achieving high uniformity for a fine shape.

Figure 10E:
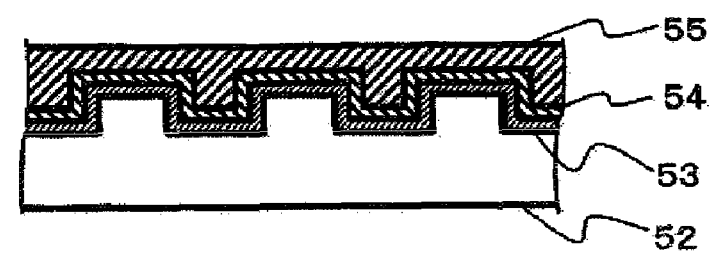

Next, a metal layer forming process of step 308 (S308) in FIG. 9 is performed. To be specific, as shown in FIG. 10E, Ni electro forming is performed to form a Ni electroformed layer 55 as a metal layer on the electric conductor layer 54. The electroforming method is the same as that of the first embodiment.

Figure 10F:
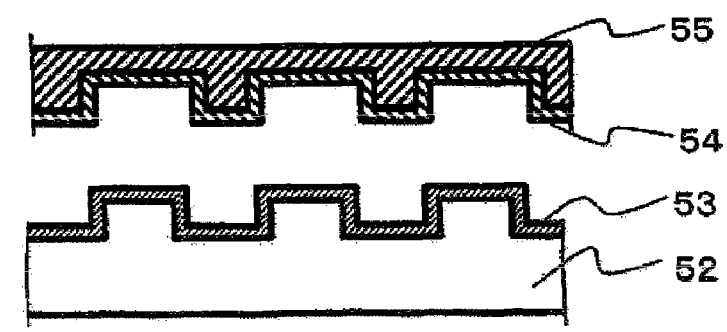

Next, an exfoliating process of step 310 (S310) in FIG. 9 is performed. To be specific, as shown in FIG. 10F, the Si master disk 52 serving as a master and the electric conductor layer 54 and the Ni electroformed layer 55 are exfoliated from each other. The monomolecular layer 53 is formed between the Si master disk 52 and the electric conductor layer 54. Since the monomolecular layer 53 is provided, an exfoliating property for exfoliating the electric conductor layer 54 and the Ni electroformed layer 55 from the Si master disk 52 is improved, so that the electric conductor layer 54 and the Ni electroformed layer 55 can be exfoliated from the Si master disk 52 in a remarkably fine state.

Through these processes, a master disk including the electric conductor layer 54 and the Ni electroformed layer 55 is fabricated. In the metal layer forming process, by changing solutions during electroforming, materials such as FeCo and Cr can be electroformed in addition to Ni. Further, according to the present embodiment, the electroforming method of electroplating was described in the metal layer forming process of step 308. Electroplating may be electroless plating which can also improve the exfoliating property.

The master disk including the electric conductor layer 54 and Ni electroformed layer 55 formed thus can be used as a master disk 46 for magnetic transfer by forming, when necessary as in the first embodiment, a magnetic layer and a protective layer on the surface where a concavo-convex pattern is formed, and the master disk is used when a servo pattern is magnetically transferred to a transfer magnetic disk 40 serving as a magnetic recording medium. Therefore, it is possible to manufacture a magnetic recording medium and a magnetic recording/reproducing apparatus.

Fourth Embodiment

In the present embodiment, a plurality of master disks serving as master recording media are fabricated by using metal master disks fabricated in the first embodiment.

Figure 11:
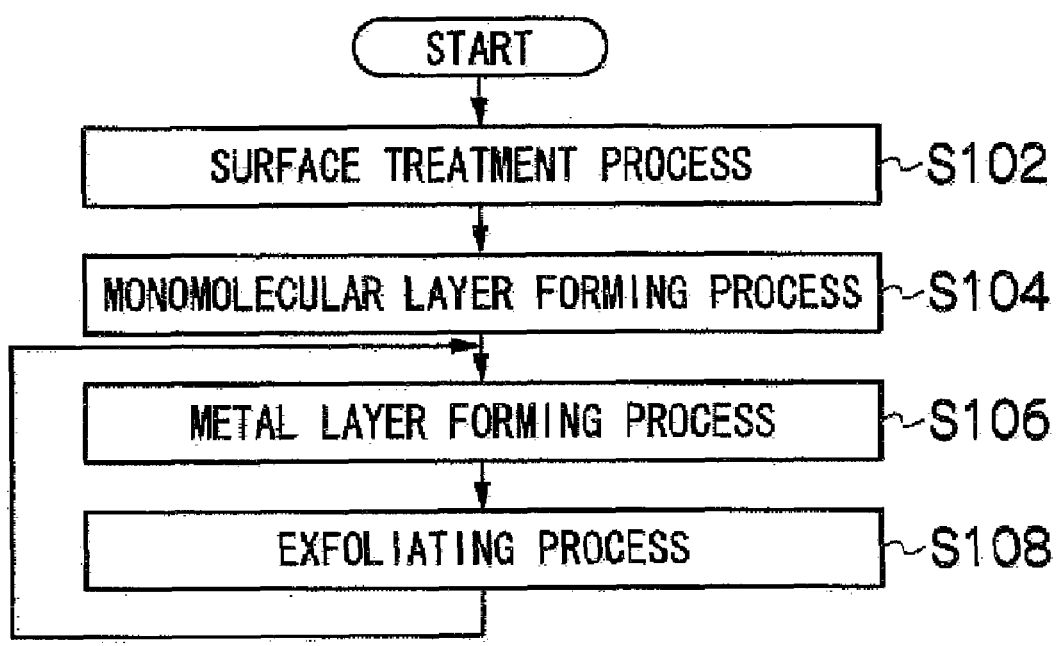
FIG. 11 is a flowchart showing a method of manufacturing a master disk according to the fourth embodiment.

Referring to FIGS. 2A to 2D and 11, the present embodiment will be described below. FIG. 11 shows a flow of fabricating the master disk according to the present embodiment.

The surface treatment process of step 102 (S102), the monomolecular layer forming process of step 104 (S104), the metal layer forming process of step 106 (S106), and the exfoliating process of step 108 (S108) are sequentially performed. The specific method is the same as that of the first embodiment.

Thereafter, by using a metal master disk 72 on which a monomolecular layer 73 adheres after the master disk made up of a Ni electroformed layer 74 is exfoliated as shown in FIG. 2D, a metal layer is formed again as in step 106 of FIG. 11. The formed monomolecular layer 73 is relatively strong and is hardly destroyed by electroforming, offering an advantage when the master disk is fabricated with a high throughput and low cost. To be specific, Ni electroforming is performed as shown in FIG. 2C and exfoliation in step 108 is performed, so that the master disk is fabricated.

By repeating the processes of steps 106 and 108 in FIG. 11, a number of master disks having the same shape can be manufactured with low cost without fabricating another metal master disk 72, thereby offering a considerable advantage in cost and time.

The master disk including the Ni electro formed layer 74 fabricated thus can be used as a master disk 46 for magnetic transfer by forming, when necessary as in the first embodiment, a magnetic layer and a protective layer, and the master disk is used when a servo pattern is magnetically transferred to a transfer magnetic disk 40 serving as a magnetic recording medium. Therefore, it is possible to manufacture a magnetic recording medium and a magnetic recording/reproducing apparatus.

Fifth Embodiment

In the present embodiment, a plurality of master disks serving as master recording media are fabricated by using Si master disks fabricated in the second embodiment.

Figure 12:
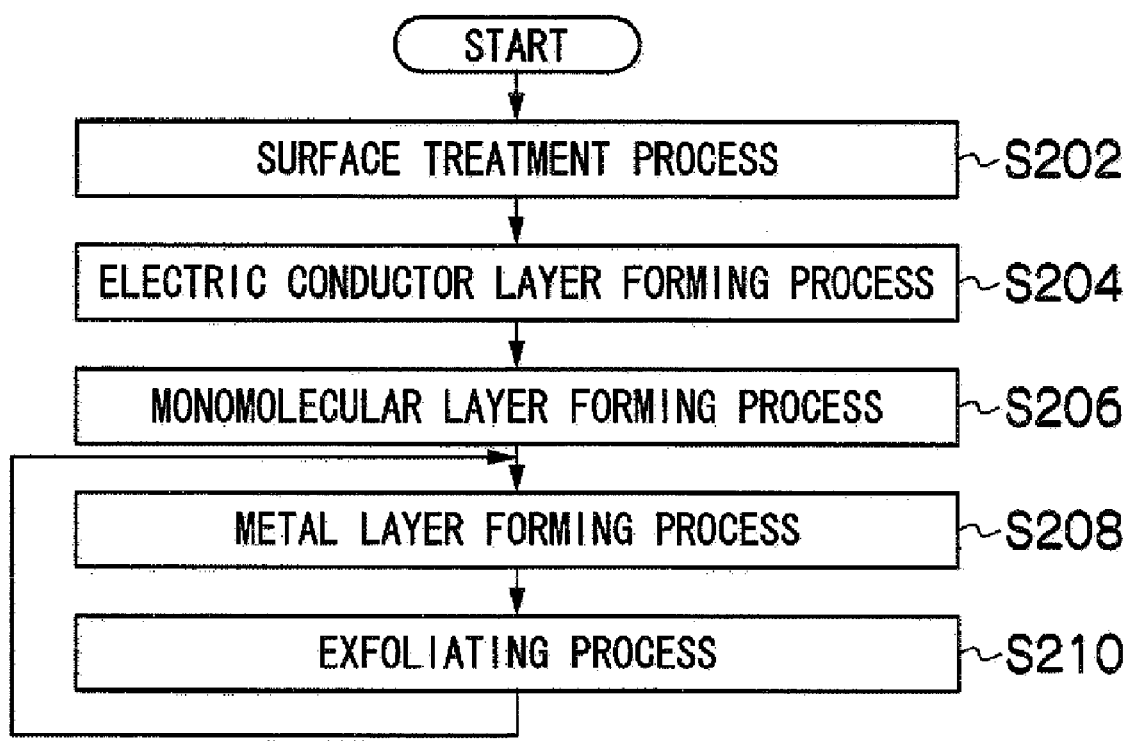
FIG. 12 is a flowchart showing a method of manufacturing a master disk according to the fifth embodiment.

Referring to FIGS. 8A to 8F and 12, the present embodiment will be described below. FIG. 12 shows a flow of fabricating the master disk according to the present embodiment.

The surface treatment process of step 202 (S202), the electric conductor layer forming process of step 204 (S204), the monomolecular layer forming process of step 206 (S206), the metal layer forming process of step 208 (S208), and the exfoliating process of step 210 (S210) are sequentially performed. The specific method is the same as that of the second embodiment.

Thereafter, by using a Si master disk 92 having a monomolecular layer 94 adhering on an electric conductor layer 93 after the master disk made up of a Ni electroformed layer 95 is exfoliated as shown in FIG. 8F, a metal layer is formed again as in step 208 of FIG. 12. The formed monomolecular layer 94 is relatively strong and is hardly destroyed by electroforming, offering an advantage when the master disk is fabricated with a high throughput and low cost. To be specific, Ni electroforming is performed as shown in FIG. 8E and exfoliation in step 210 is performed, so that the master disk is fabricated.

By repeating the processes of steps 208 and 210 in FIG. 12, a number of master disks having the same shape can be manufactured with low cost without fabricating another Si master disk 92, thereby offering a considerable advantage in cost and time.

The master disk including the Ni electroformed layer 95 fabricated thus can be used as a master disk 46 for magnetic transfer by forming, when necessary as in the first embodiment, a magnetic layer and a protective layer, and the master disk is used when a servo pattern is magnetically transferred to a transfer magnetic disk 40 serving as a magnetic recording medium. Therefore, it is possible to manufacture a magnetic recording medium and a magnetic recording/reproducing apparatus.

Sixth Embodiment

In the present embodiment, a plurality of master disks serving as master recording media are fabricated by using Si master disks fabricated in the third embodiment.

Figure 13:
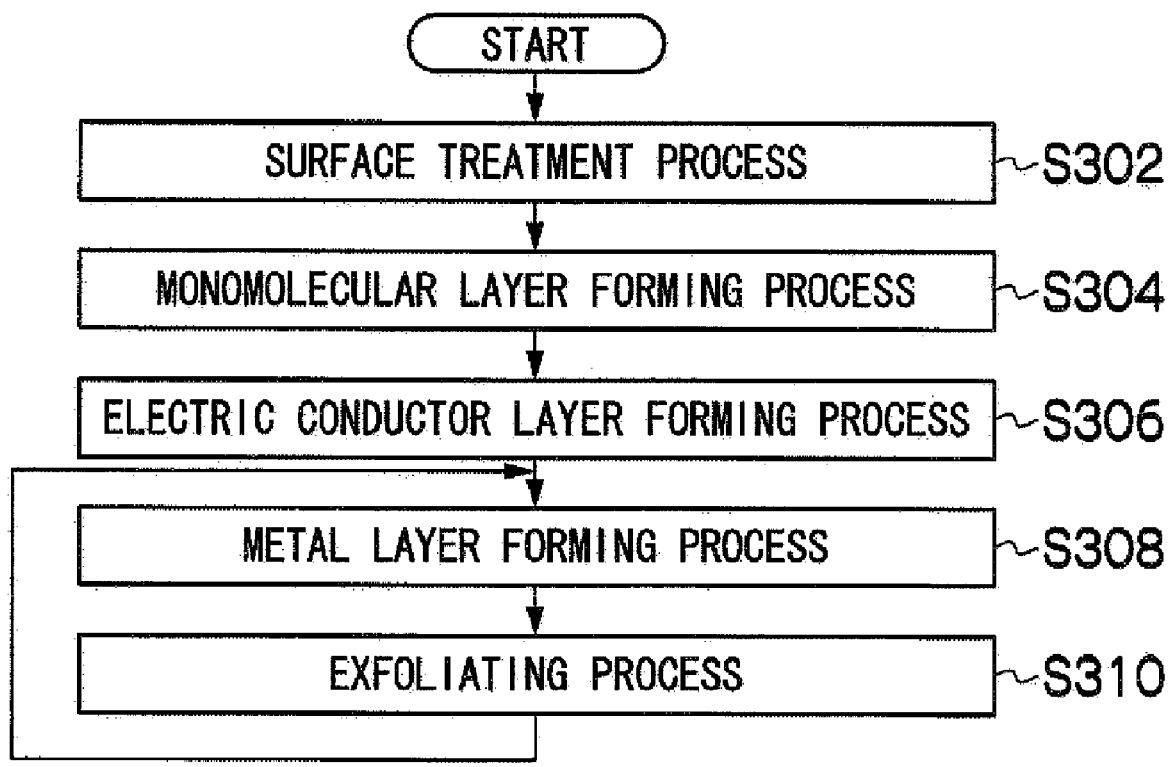
FIG. 13 is a flowchart showing a method of manufacturing a master disk according to the sixth embodiment.

Referring to FIGS. 10A to 10F and 13, the present embodiment will now be described. FIG. 13 shows a flow of fabricating the master disk according to the present embodiment.

The surface treatment process of step 302 (S302), the monomolecular layer forming process of step 304 (S304), the electric conductor layer forming process of step 306 (S306), the metal layer forming process of step 308 (S308), and the exfoliating process of step 310 (S310) are sequentially performed. The specific method is the same as that of the third embodiment.

Thereafter, by using a Si master disk 52 on which a monomolecular layer 53 adheres after the master disk made up of an electric conductor layer 54 and a Ni electroformed layer 55 is exfoliated as shown in FIG. 10F, the electric conductor layer 54 of step 306 in FIG. 13 is formed again as shown in FIG. 10D. And then, a metal layer is formed as in step 308. The formed monomolecular layer 53 is relatively strong and is hardly destroyed by electroforming, offering an advantage when the master disk is fabricated with a high throughput and low cost. To be specific, Ni electroforming is performed as shown in FIG. 10E and exfoliation in step 310 is performed, so that the master disk is fabricated.

By repeating the processes of steps 306 and 310 in FIG. 13, a number of master disks having the same shape can be manufactured with low cost without fabricating another Si master disk 52, thereby offering a considerable advantage in cost and time.

The master disk including the electric conductor layer 54 and Ni electroformed layer 55 formed thus can be used as a master disk 46 for magnetic transfer by forming, when necessary as in the first embodiment, a magnetic layer and a protective layer, and the master disk is used when a servo pattern is magnetically transferred to a transfer magnetic disk 40 serving as a magnetic recording medium. Therefore, it is possible to manufacture a magnetic recording medium and a magnetic recording/reproducing apparatus.

Seventh Embodiment

In the present embodiment, a plurality of master disks serving as master recording media are fabricated by using metal master disks fabricated in the first embodiment.

Figure 14:
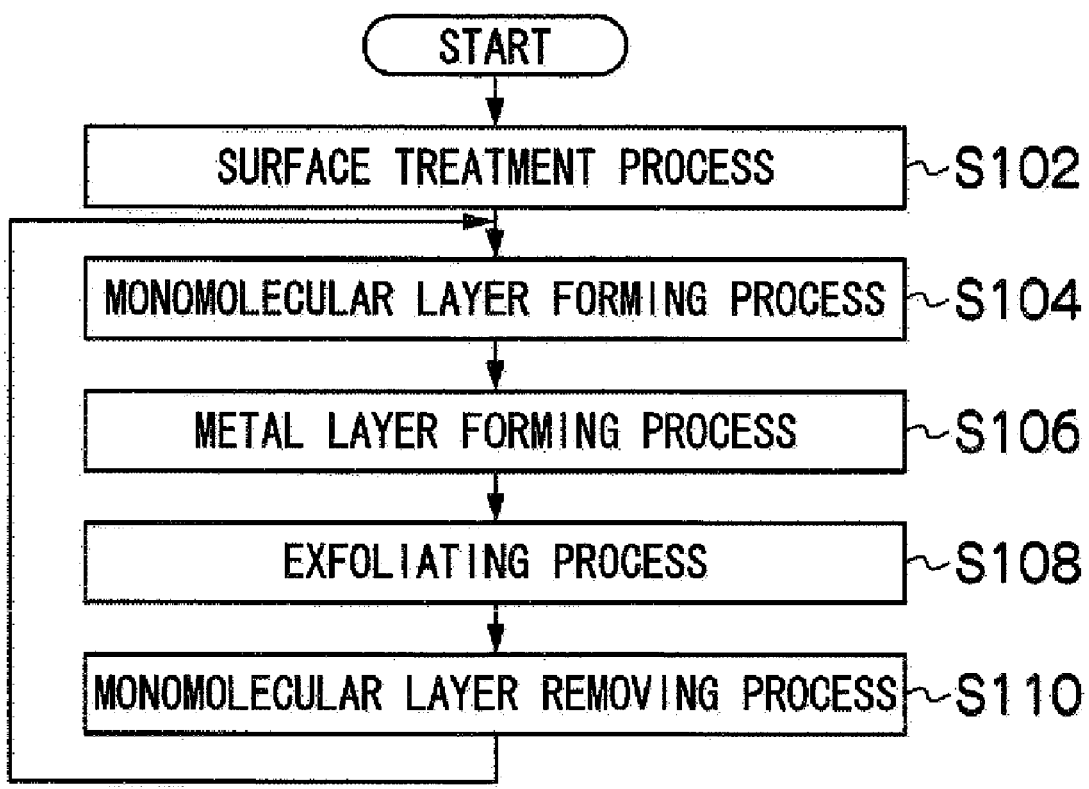
FIG. 14 is a flowchart showing a method of manufacturing a master disk according to the seventh embodiment.

Referring to FIGS. 2A to 2D, 14 and 15A and 15B, the present embodiment will be described below. FIG. 14 shows a flow of fabricating the master disk according to the present embodiment.

The surface treatment process of step 102 (S102) in FIG. 14, the monomolecular layer forming process of step 104 (S104), the metal layer forming process of step 106 (S106), and the exfoliating process of step 108 (S108) are sequentially performed. The specific method is the same as that of the first embodiment.

Figure 15A:
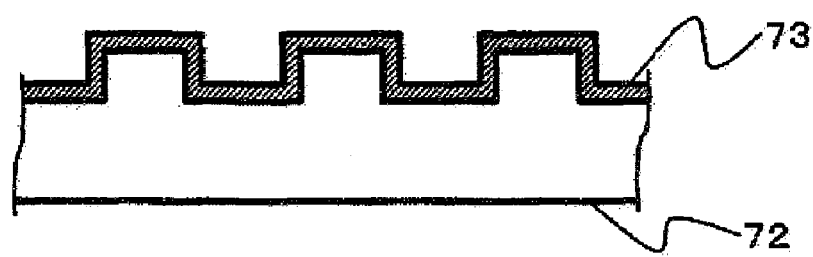
FIGS. 15A and 15B are explanatory drawings showing the method of manufacturing the master disk according to the seventh embodiment.

After that, in the monomolecular layer removing process of step 110 (S110) in FIG. 14, a monomolecular layer 73 adhering to a metal master disk 72 shown in FIG. 15A is removed after the master disk including a Ni electroformed layer 74 is exfoliated as shown in FIG. 2D. This is because there is still a possibility that the monomolecular layer 73 formed on the metal master disk 72 may be destroyed or deformed for some reason in the exfoliating process, and thus it is necessary to prevent the possibility particularly when a master disk is fabricated with high accuracy.

Figure 15B:
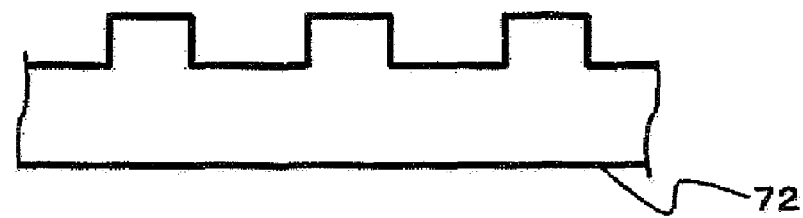

To be specific, ashing is performed by oxygen plasma. Thus as shown in FIG. 15B, the monomolecular layer 73 can be perfectly removed from the metal master disk 72.

Thereafter, the process advances to step 104 in FIG. 14. Ni electroforming is performed after the monomolecular layer 73 is formed again as shown in FIG. 2B, and then exfoliation in step 108 is performed, so that the master disk is fabricated. By repeating the processes of steps 104 to 110, a number of master disks having the same shape can be accurately manufactured with low cost without fabricating another metal master disk 72, thereby offering an advantage in cost and time.

The master disk including the Ni electro formed layer 74 fabricated thus can be used as a master disk 46 for magnetic transfer by forming, when necessary as in the first embodiment, a magnetic layer and a protective layer, and the master disk is used when a servo pattern is magnetically transferred to a transfer magnetic disk 40 serving as a magnetic recording medium. Therefore, it is possible to manufacture a magnetic recording medium and a magnetic recording/reproducing apparatus.

Eighth Embodiment

In the present embodiment, a plurality of master disks serving as master recording media are fabricated by using Si master disks fabricated in the second embodiment.

Figure 16:
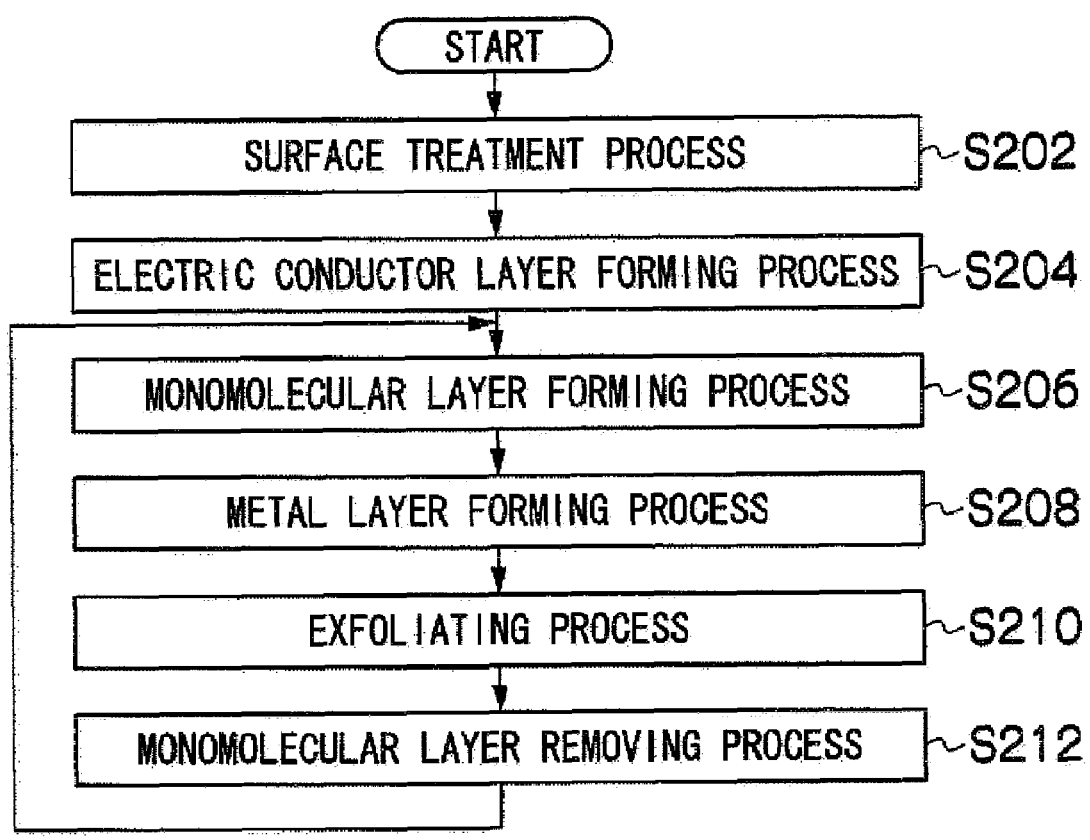
FIG. 16 is a flowchart showing a method of manufacturing a master disk according to the eighth embodiment.

Referring to FIGS. 8A to 8F, 16 and 17A and 17B, the present embodiment will be described below. FIG. 16 shows a flow of fabricating the master disk according to the present embodiment.

The surface treatment process of step 202 (S202), the electric conductor layer forming process of step 204 (S204), the monomolecular layer forming process of step 206 (S206), the metal layer forming process of step 208 (S208), and the exfoliating process of step 210 (S210) in FIG. 16 are sequentially performed. The specific method is the same as that of the second embodiment.

After that, in the monomolecular layer removing process of step 212 (S212) in FIG. 16, a monomolecular layer 94 adhering to an electric conductor layer 93 on an uneven surface of a Si master disk 92 in FIG. 17A is removed after the master disk including a Ni electroformed layer 95 is exfoliated in FIG. 8F. This is because there is still a possibility that the monomolecular layer 94 formed on the Si master disk 92 may be destroyed or deformed for some reason in the exfoliating process, and thus it is necessary to prevent the possibility particularly when a master disk is fabricated with high accuracy.

To be specific, ashing is performed by oxygen plasma. Thus as shown in FIG. 17B, the monomolecular layer 94 can be perfectly removed from the electric conductor layer 93 of the Si master disk 92.

Thereafter, the process advances to step 206 in FIG. 16. Ni electroforming is performed after the monomolecular layer 94 is formed again as shown in FIG. 8B, and then exfoliation in step 210 is performed, so that the master disk is fabricated. By repeating the processes of steps 206 to 212, a number of master disks having the same shape can be accurately manufactured with low cost without fabricating another Si master disk 92, thereby offering an advantage in cost and time.

The master disk including the Ni electroformed layer 95 fabricated thus can be used as a master disk 46 for magnetic transfer by forming, when necessary as in the first embodiment, a magnetic layer and a protective layer, and the master disk is used when a servo pattern is magnetically transferred to a transfer magnetic disk 40 serving as a magnetic recording medium. Therefore, it is possible to manufacture a magnetic recording medium and a magnetic recording/reproducing apparatus.

Ninth Embodiment

In the present embodiment, a plurality of master disks serving as master recording media are fabricated by using Si master disks fabricated in the third embodiment.

Figure 18:
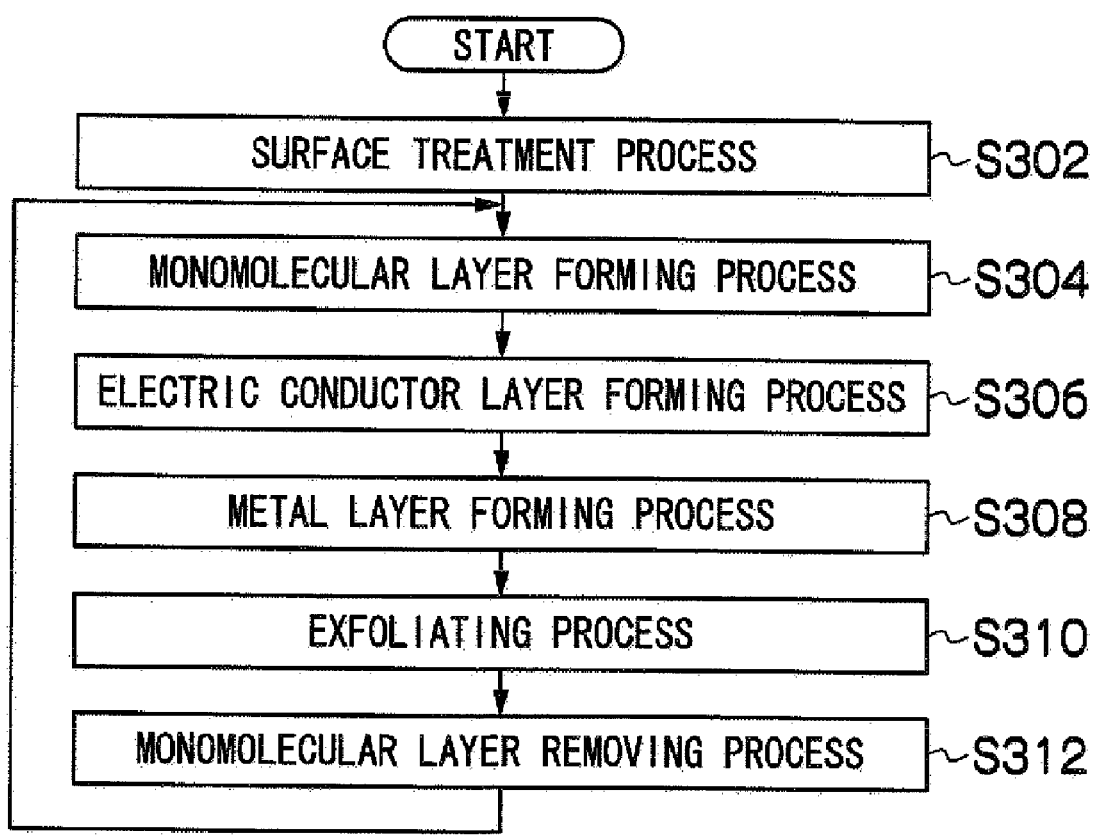
FIG. 18 is a flowchart showing a method of manufacturing a master disk according to the ninth embodiment.

Referring to FIGS. 10A to 10F, 18 and 19A and 19B, the present embodiment will be described below. FIG. 18 shows a flow of fabricating the master disk according to the present embodiment.

The surface treatment process of step 302 (S302), the monomolecular layer forming process of step 304 (S304), the electric conductor layer forming process of step 306 (S306), the metal layer forming process of step 308 (S308), and the exfoliating process of step 310 (S310) in FIG. 18 are sequentially performed. The specific method is the same as that of the third embodiment.

Figure 19A:
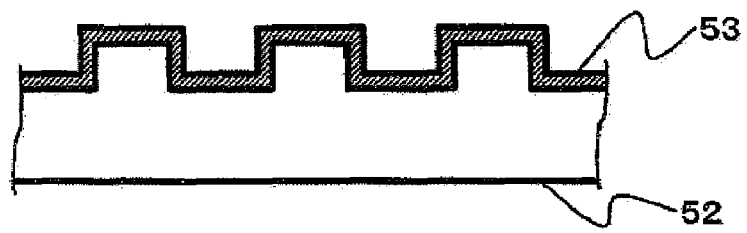
FIGS. 19A and 19B are explanatory drawings showing the method of manufacturing the master disk according to the ninth embodiment.

After that, in the monomolecular layer removing process of step 312 (S312) in FIG. 18, a monomolecular layer 53 adhering to an uneven surface of a Si master disk 52 in FIG. 19A is removed after the master disk including an electric conductor layer 54 and a Ni electroformed layer 55 is exfoliated in FIG. 10F. This is because there is still a possibility that the monomolecular layer 53 formed on the Si master disk 52 may be destroyed or deformed for some reason in the exfoliating process, and thus it is necessary to prevent the possibility particularly when a master disk is fabricated with high accuracy.

Figure 19B:
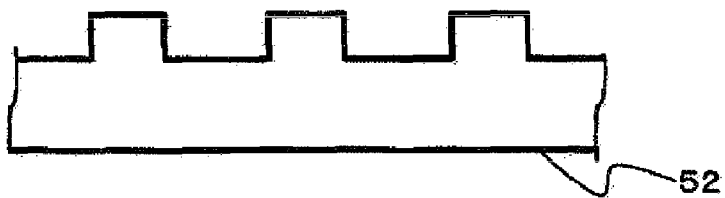

To be specific, ashing is performed by oxygen plasma. Thus as shown in FIG. 19B, the monomolecular layer 53 can be perfectly removed from the Si master disk 52.

Thereafter, the process advances to step 304 in FIG. 18. The electric conductor layer is formed and Ni electroforming is performed after the monomolecular layer 53 is formed again as shown in FIG. 10C, and then exfoliation in step 310 is performed, so that the master disk is fabricated. By repeating the processes of steps 304 to 312, a number of master disks having the same shape can be accurately manufactured with low cost without fabricating another Si master disk 52, thereby offering an advantage in cost and time.

The master disk including the electric conductor layer 54 and Ni electroformed layer 55 formed thus can be used as a master disk 46 for magnetic transfer by forming, when necessary as in the first embodiment, a magnetic layer and a protective layer, and the master disk is used when a servo pattern is magnetically transferred to a transfer magnetic disk 40 serving as a magnetic recording medium. Therefore, it is possible to manufacture a magnetic recording medium and a magnetic recording/reproducing apparatus.

The foregoing embodiments described the fabricating methods in which a positive resist is used as an example for the fabrication of the master disk. The master disk can be fabricated even with a negative resist by exposing a reversed pattern.

The above explanation specifically described the method of manufacturing a master recording medium, the magnetic transfer method using the master recording medium manufactured by the manufacturing method, and the method of manufacturing a magnetic recording medium according to the present invention. The present invention is not limited to the foregoing examples and can be improved and modified in various ways without departing from the gist of the present invention.

What is claimed is:

1. A method of manufacturing a master recording medium used for magnetic transfer and having a concavo-convex pattern formed on a surface of the recording medium, the method comprising:
    a surface treatment step of forming the concavo-convex pattern on a surface of a metal plate to fabricate a metal master disk;
    a monomolecular layer forming step of forming a monomolecular layer on a surface of the metal master disk, the surface having the concavo-convex pattern formed thereon;
    a metallic substrate forming step of dipping the metal master disk having the monomolecular layer formed thereon into a plating solution and forming the master recording medium by plating on the surface of the metal master disk, the surface having the monomolecular layer formed thereon; and
    an exfoliating step of exfoliating the master recording medium from the metal master disk.

2. The method of manufacturing a master recording medium according to claim 1, wherein
    after the exfoliating step is completed, a plurality of master recording media having the same shape are fabricated by repeating the metallic substrate forming step and the exfoliating step.

3. The method of manufacturing a master recording medium according to claim 1, wherein
    after the exfoliating step is completed, a plurality of master recording media having the same shape are fabricated by repeating:
    a monomolecular layer removing step of removing the monomolecular layer adhering to the metal master disk;
    a monomolecular layer forming step of forming, after the monomolecular layer is removed, another monomolecular layer on the surface of the metal master disk, the surface having the concavo-convex pattern formed thereon;
    a metallic substrate forming step of dipping the metal master disk having the monomolecular layer formed thereon into the plating solution and forming the master recording medium by plating on the surface of the metal master disk, the surface having the monomolecular layer formed thereon; and
    an exfoliating step of exfoliating the master recording medium from the metal master disk.

4. The method of manufacturing a master recording medium according to claim 1, wherein
    in the metallic substrate forming step, the master recording medium is formed by electroforming one of Ni, Cu, Au, Ta, Cr and a metallic element and an alloy containing one of Fe and Ni.

5. The method of manufacturing a master recording medium according to claim 1, wherein
    the monomolecular layer is made of a material containing carbon.

6. The method of manufacturing a master recording medium according to claim 1, further comprising the steps of:
    forming a protective film on the master recording medium exfoliated in the exfoliating step;
    stamping the master recording medium having the protective film formed thereon with a predetermined die;
    removing the protective film adhering to the master recording medium after the master recording medium is stamped with the die;
    forming a magnetic layer made of a soft magnetic material on the surface of the master recording medium after the protective film is removed, the surface having the concavo-convex pattern formed thereon; and
    forming a protective layer on the magnetic layer.

7. A magnetic transfer method, comprising:
    a step of contacting the master recording medium according to claim 1 and a magnetic recording medium; and
    a magnetic transfer step of magnetically transferring, to the magnetic recording medium, information including a concavo-convex pattern recorded on the master recording medium, by applying a magnetic field to the contacted master recording medium and magnetic recording medium.

8. A method of manufacturing a magnetic recording medium, comprising:

a step of contacting the master recording medium according to claim 1 and the magnetic recording medium; and a magnetic transfer step of magnetically transferring, to the magnetic recording medium, information including a concavo-convex pattern recorded on the master recording medium, by applying a magnetic field to the contacted master recording medium and magnetic recording medium.

9. A method of manufacturing a master recording medium used for magnetic transfer and having a concavo-convex pattern formed on a surface of the recording medium, the method comprising:

a surface treatment step of forming the concavo-convex pattern on a surface of one of a nonconductive material and a semiconductor material to fabricate a nonconductive master disk;

an electric conductor layer forming step of forming an electric conductor layer on a surface of the nonconductive master disk, the surface having the concavo-convex pattern formed thereon;

a monomolecular layer forming step of forming a monomolecular layer on the electric conductor layer;

a metallic substrate forming step of dipping the nonconductive master disk having the monomolecular layer formed thereon into a plating solution and forming the master recording medium by plating on the surface of the nonconductive master disk, the surface having the monomolecular layer formed thereon; and an exfoliating step of exfoliating the master recording medium from the nonconductive master disk.

10. The method of manufacturing a master recording medium according to claim 9, wherein after the exfoliating step is completed, a plurality of master recording media having the same shape are fabricated by repeating the metallic substrate forming step and the exfoliating step.

11. The method of manufacturing a master recording medium according to claim 9, wherein after the exfoliating step is completed, a plurality of master recording media having the same shape are fabricated by repeating:

a monomolecular layer removing step of removing the monomolecular layer adhering to a surface of the electric conductor layer of the nonconductive master disk;

a monomolecular layer forming step of forming, after the monomolecular layer is removed, another monomolecular layer on the surface of the electric conductor layer of the nonconductive master disk;

a metallic substrate forming step of dipping the nonconductive master disk having the monomolecular layer formed thereon into the plating solution and forming the master recording medium by plating on the surface of the nonconductive master disk, the surface having the monomolecular layer formed thereon; and an exfoliating step of exfoliating the master recording medium from the nonconductive master disk.

12. The method of manufacturing a master recording medium according to claim 9, wherein the nonconductive master disk is made of a material including Si, $SiO_2$, SiC and $Al_2O_3$.

13. The method of manufacturing a master recording medium according to claim 9, wherein the electric conductor layer is formed by a sputtering method, a CVD method, a vacuum evaporation method, and an electroless plating method.

14. The method of manufacturing a master recording medium according to claim 9, wherein in the metallic substrate forming step, the master recording medium is formed by electroforming one of Ni, Cu, Au, Ta, Cr and a metallic element and an alloy containing one of Fe and Ni.

15. The method of manufacturing a master recording medium according to claim 9, wherein the monomolecular layer is made of a material containing carbon.

16. The method of manufacturing a master recording medium according to claim 9, further comprising the steps of:

forming a protective film on the master recording medium exfoliated in the exfoliating step;

stamping the master recording medium having the protective film formed thereon with a predetermined die;

removing the protective film adhering to the master recording medium after the master recording medium is stamped with the die;

forming a magnetic layer made of a soft magnetic material on the surface of the master recording medium after the protective film is removed, the surface having the concavo-convex pattern formed thereon; and forming a protective layer on the magnetic layer.

17. A magnetic transfer method, comprising:

a step of contacting the master recording medium according to claim 9 and a magnetic recording medium; and a magnetic transfer step of magnetically transferring, to the magnetic recording medium, information including a concavo-convex pattern recorded on the master recording medium, by applying a magnetic field to the contacted master recording medium and magnetic recording medium.

18. A method of manufacturing a magnetic recording medium, comprising:

a step of contacting the master recording medium according to claim 9 and the magnetic recording medium; and a magnetic transfer step of magnetically transferring, to the magnetic recording medium, information including a concavo-convex pattern recorded on the master recording medium, by applying a magnetic field to the contacted master recording medium and magnetic recording medium.

19. A method of manufacturing a master recording medium used for magnetic transfer and having a concavo-convex pattern formed on a surface of the recording medium, the method comprising:

a surface treatment step of forming the concavo-convex pattern on a surface of one of a nonconductive material and a semiconductor material to fabricate a nonconductive master disk;

a monomolecular layer forming step of forming a monomolecular layer on a surface of the nonconductive master disk, the surface having the concavo-convex pattern formed thereon;

an electric conductor layer forming step of forming an electric conductor layer on the monomolecular layer;

a metallic substrate forming step of dipping the nonconductive master disk having the electric conductor layer formed thereon into a plating solution and forming the master recording medium by plating on the surface of the nonconductive master disk, the surface having the electric conductor layer formed thereon; and an exfoliating step of exfoliating the master recording medium from the nonconductive master disk.

20. The method of manufacturing a master recording medium according to claim 19, wherein after the exfoliating step is completed, a plurality of master recording media having the same shape are fabricated by repeating the electric conductor layer forming step, the metallic substrate forming step, and the exfoliating step.

21. The method of manufacturing a master recording medium according to claim 19, wherein
after the exfoliating step is completed, a plurality of master recording media having the same shape are fabricated by repeating:
a monomolecular layer removing step of removing the monomolecular layer adhering to the nonconductive master disk;
a monomolecular layer forming step of forming, after the monomolecular layer is removed, another monomolecular layer on the surface of the nonconductive master disk, the surface having the concavo-convex pattern formed thereon;
an electric conductor layer forming step of forming an electric conductor layer on the monomolecular layer;
a metallic substrate forming step of dipping the nonconductive master disk having the electric conductor layer formed thereon into the plating solution and forming the master recording medium by plating on the surface of the nonconductive master disk, the surface having the electric conductor layer formed thereon; and
an exfoliating step of exfoliating the master recording medium from the nonconductive master disk.

22. The method of manufacturing a master recording medium according to claim 19, wherein
the nonconductive master disk is made of a material including Si, $SiO_2$, SiC and $Al_2O_3$.

23. The method of manufacturing a master recording medium according to claim 19, wherein
the electric conductor layer is formed by a sputtering method, a CVD method, a vacuum evaporation method, and an electroless plating method.

24. The method of manufacturing a master recording medium according to claim 19, wherein
in the metallic substrate forming step, the master recording medium is formed by electroforming one of Ni, Cu, Au, Ta, Cr and a metallic element and an alloy containing one of Fe and Ni.

25. The method of manufacturing a master recording medium according to claim 19, wherein
the monomolecular layer is made of a material containing carbon.

26. The method of manufacturing a master recording medium according to claim 19, further comprising the steps of:
forming a protective film on the master recording medium exfoliated in the exfoliating step;
stamping the master recording medium having the protective film formed thereon with a predetermined die;
removing the protective film adhering to the master recording medium after the master recording medium is stamped with the die;
forming a magnetic layer made of a soft magnetic material on the surface of the master recording medium after the protective film is removed, the surface having the concavo-convex pattern formed thereon; and
forming a protective layer on the magnetic layer.

27. A magnetic transfer method, comprising:
a step of contacting the master recording medium according to claim 19 and a magnetic recording medium; and
a magnetic transfer step of magnetically transferring, to the magnetic recording medium, information including a concavo-convex pattern recorded on the master recording medium, by applying a magnetic field to the contacted master recording medium and magnetic recording medium.

28. A method of manufacturing a magnetic recording medium, comprising:
a step of contacting the master recording medium according to claim 19 and the magnetic recording medium; and
a magnetic transfer step of magnetically transferring, to the magnetic recording medium, information including a concavo-convex pattern recorded on the master recording medium, by applying a magnetic field to the contacted master recording medium and magnetic recording medium.

* * * * *